US012348839B2

(12) United States Patent
Van Bergen et al.

(10) Patent No.: US 12,348,839 B2
(45) Date of Patent: Jul. 1, 2025

(54) INTELLIGENT MEDIA PRODUCTION FOR ENHANCED STREAMING OF A LIVE SPORTING EVENT

(71) Applicant: Intelicaster, LLC, Arlington Heights, IL (US)

(72) Inventors: Matt Van Bergen, Arlington Heights, IL (US); Paul Michelotti, Glenview, IL (US); Randon Morford, Saratoga Springs, UT (US); Tim Coleman, Zion Crossroads, VA (US)

(73) Assignee: Intelicaster, LLC, Arlington Heights, IL (US)

( * ) Notice: Subject to any disclaimer, the term of this patent is extended or adjusted under 35 U.S.C. 154(b) by 236 days.

(21) Appl. No.: 18/083,183

(22) Filed: Dec. 16, 2022

(65) Prior Publication Data

US 2024/0205519 A1 Jun. 20, 2024

(51) Int. Cl.
*H04N 21/8547* (2011.01)
*H04N 21/2187* (2011.01)
(Continued)

(52) U.S. Cl.
CPC ..... *H04N 21/8547* (2013.01); *H04N 21/2187* (2013.01); *H04N 21/23106* (2013.01);
(Continued)

(58) Field of Classification Search
CPC .......... H04N 21/8547; H04N 21/2187; H04N 21/23106; H04N 21/23418;
(Continued)

(56) References Cited

U.S. PATENT DOCUMENTS 9,056,253 B2   6/2015  Thompson et al.
9,535,879 B2   1/2017  Allen
(Continued)

FOREIGN PATENT DOCUMENTS

| EP | 1480450 A2 * | 11/2004 | ............. H04N 5/222 |
| WO | WO-2014191990 A1 * | 12/2014 | ........... G11B 27/036 |
| WO | WO-2015100116 A1 * | 7/2015 | ............... G06T 7/20 |

OTHER PUBLICATIONS

J. Quiroga, H. Carrillo, E. Maldonado, J. Ruiz and L. M. Zapata, "As Seen on TV: Automatic Basketball Video Production using Gaussian-based Actionness and Game States Recognition, " 2020 IEEE/CVF Conference on Computer Vision and Pattern Recognition Workshops (CVPRW), Seattle, WA, 2020, pp. 3911-3920. (Year: 2020).*

(Continued)

*Primary Examiner* — Cynthia M Fogg
(74) *Attorney, Agent, or Firm* — Kunzler Bean & Adamson; Thomas D Briscoe

(57) ABSTRACT

For intelligent sportscast production for enhanced streaming of a live sporting event, a method includes selecting a production route model with predetermined conditions that indicate values for initial sportscast velocity vectors for composing an ordered stream of synthesized audio segments and/or synthesized video segments for a live sporting event occurring at a sports venue based at least on event type, game state, hosting team, and sportscast output type; caching sets of live event observations for generating production cues during the live sporting event to be composed as synthesized audio segments and/or synthesized video segments, the live event observations derived from scoreboard data obtained from: a live scoreboard data feed associated with an onsite scoreboard; and/or machine recognition of game state data from a live video feed captured by an onsite (Continued)

camera; and producing adjusted synthesized content velocity vectors based on the live event observations and/or a current game state.

20 Claims, 14 Drawing Sheets

(51) Int. Cl.
  *H04N 21/231* (2011.01)
  *H04N 21/234* (2011.01)
  *H04N 21/2368* (2011.01)
  *H04N 21/81* (2011.01)

(52) U.S. Cl.
  CPC ... *H04N 21/23418* (2013.01); *H04N 21/2368* (2013.01); *H04N 21/812* (2013.01)

(58) Field of Classification Search
  CPC ............. H04N 21/2368; H04N 21/812; H04N 21/44008; H04N 21/4223; H04N 21/458; H04N 7/181; H04N 17/002; H04N 5/247; G06T 2207/30221; G06T 2207/10016; G06K 9/00724; G06K 9/3258; G06K 9/00751; G06K 9/00718; G06K 9/00744; G06F 17/248; G06F 17/2775; G06F 17/21; A63B 24/0062; A63B 2024/0025; A63B 2024/0028; G11B 27/031
  USPC .......................................................... 725/32
  See application file for complete search history.

(56) References Cited

U.S. PATENT DOCUMENTS

| | | | |
|---|---|---|---|
| 9,555,310 B2 | 1/2017 | Aman et al. | |
| 10,417,500 B2 | 9/2019 | Ray et al. | |
| 10,713,494 B2 | 7/2020 | Chang et al. | |
| 2011/0169959 A1* | 7/2011 | DeAngelis | G06V 20/42 348/157 |
| 2013/0222418 A1* | 8/2013 | Campbell | G06F 3/1454 345/629 |
| 2015/0131845 A1 | 5/2015 | Forouhar et al. | |
| 2015/0189243 A1* | 7/2015 | Cucco | H04N 23/90 348/157 |
| 2015/0297949 A1* | 10/2015 | Aman | G06T 7/246 348/157 |
| 2016/0008695 A1 | 1/2016 | Aman et al. | |
| 2016/0212337 A1* | 7/2016 | Sagas | H04N 5/222 |
| 2017/0178687 A1* | 6/2017 | Tamir | G11B 27/036 |
| 2018/0007403 A1* | 1/2018 | Pizzurro | H04N 21/2543 |
| 2019/0215475 A1* | 7/2019 | Herz | G06T 1/0007 |
| 2020/0068272 A1 | 2/2020 | Packard et al. | |
| 2021/0150219 A1 | 5/2021 | Karoui et al. | |
| 2022/0108112 A1 | 4/2022 | Ottenwess et al. | |
| 2022/0327830 A1* | 10/2022 | Chang | H04N 5/268 |
| 2023/0290144 A1* | 9/2023 | Oz | H04N 21/8549 |

OTHER PUBLICATIONS

Baillie, Jose—2003—Audio-Based Event Detection for Sports Video—Lecture Notes in Computer Science—annotated.pdf.
Bhalla et al.—2019—2019 6th International Conference on Signal Processing and Integrated Networks (SPIN) Mar. 7-8, 2019,—annotated.pdf.
Charleer et al.—2018—Real-time dashboards to support esports spectating—CHI Play 2018—Proceedings of the 2018 Annual Symposium o-annotated.pdf.
Chen et al.—2011—An autonomous framework to produce and distribute personalized team-sport video summaries A bas—annotated.pdf.
Chen et al.—2016—GameFlow Narrative Visualization of NBA Basketball Games—IEEE Transactions on Multimedia—annotated.pdf.
Cullell. Xavier—2021—Basketball information extraction from play-by-play data—Bachelor's Degree Final Thesis—annotated.pdf.
Gartenberg—2020—fox-sports-baseball-virtual-fans-epic-unreal-engine-empty-stadiums-mlb Real sports, fake fans—The Verge-annotated.pdf.
Goncu et al.—2021—'Did You See That!' Enhancing the Experience of Sports Media Broadcast for Blind People—Lecture Notes in Comp—annotated.pdf.
Heaven—2012—AI sports commentator knows all the best stories_ New Scientist—NewScientist.com—annotated.pdf.
Chiki et al.—2020—A Timing Determination Method for the Insertion of Automated Audio Descriptions into Live TV Sports Programs—Jo-annotated.pdf.
Janssen—2019—Open Source Sports Video Analysis using Maching Learning—DEV Community—Dev.to—annotated.bdf.
Kahn—2019—IBM Trials A.I. That Can Do Soccer Commentary Fortune—Fortune—annotated.pdf.
Kumano—2019—Generation of Automated Sports Commentary from Live Sports Data—2019 IEEE International Symposium on Broadband Multime—annotated.pdf.
Lee et al.—2009—Highlight generation for basketball video using probabilistic excitement—Proceedings—2009 IEEE International—annotated.pdf.
Lee et al.—2014—Automated story selection for color commentary in sports—IEEE Transactions on Computational Intelligence—annotated.pdf.
Merler et al.—2019—Automatic curation of sports highlights using multimodal excitement features—IEEE Transactions on Multimedia—annotated.pdf.
Nepal et al.—2001—Automatic Detection of 'Goal' Segments in Basketball Videos—Proceedings of the ninth ACM Internat—annotated.pdf.
Scotti et al.—2019—SFERANET Automatic Generation of Football Highlights—CS & IT Conference Proceedings—annotated.pdf.
Shukla et al.—2018—Automatic Cricket Highlight generation using Event-Driven and Excitement-Based features—Proceedings of the IEEE—annotated.pdf.
Trivedi—2019—AI generating football video game commentary_ by Chintan Trivedi_ owards Data Science—Toward Data Science (Medium.—annotated.pdf.
Zhang et al.—2016—Towards Constructing Sports News from Live Text Commentary—Proceedings of the 54th Annual Meeting of the Asso—annotated.pdf.

* cited by examiner

FIG. 5

INTELLIGENT MEDIA PRODUCTION FOR ENHANCED STREAMING OF A LIVE SPORTING EVENT

FIELD

The subject matter disclosed herein relates to sportscast media production and more particularly relates to intelligent sportscast production for enhanced streaming of a live sporting event.

BACKGROUND

'Production values' is a term sometimes used to describe the skillsets that are employed by creative teams in video and television production. Typically, the process of producing for live or minimally delayed broadcast sporting events, whether on television or online, may be time-consuming and expensive. A variety of onsite personnel may be needed for live production (e.g., producers, announcer, color commentator, spotter, technicians, camera operators, etc.). In order to resolve any technological issues that may develop and generate a final output in real time, the onsite staff often has to collaborate with off-site staff (such as those working in a television studio). Thus, organizers of many small-scale sporting events such as school, club, or other localized, or special interest sporting events may be constrained to settle for direct streaming of camera and microphones feeds with little or minimal production quality.

Mobile phones and action cameras with wireless connection may enable direct livestreaming of generally unenhanced audiovisual (AV) feeds from a live sporting event. Furthermore, improvements in site-specific camera technology such as wide-angle video capture, auto-tracking features, and advance video uploading and editing may facilitate capture of game time audiovisual feeds for editing, creating highlight videos, and for postgame analysis. Some systems for AV recording of small-scale sporting events allow a local organization to upload games to a centralized service with a single click when games are final. An experienced production team for the centralized service then produces all of the video content uploaded by the localization in as little as four hours. Sports networks for streaming high-school or other limited scale sporting events facilitate broader distribution of such events.

However, even with recent advancements in audiovisual capture and video streaming technologies, existing systems for small scale sportscasting lack the intelligence needed to dynamically facilitate interesting, localized, informative, and profitable production of live small scale sporting events.

BRIEF SUMMARY

A method for intelligent sportscast production for enhanced streaming of a live sporting event is disclosed. An apparatus and computer program product also perform the functions of the method.

In various aspects, the techniques described herein relate to a method including: determining, for producing a sportscast media stream of a live sporting event, a production route model with target sportscast velocity vectors corresponding to a plurality of waypoints that indicate a change in content direction and/or content magnitude for a sportscast segment of the live sporting event; generating production cues for producing sportscast content including dynamically ordered audio segments and/or video segments that are synthesized based on live event observations and/or precommitted content, wherein the production cues are selected from cached groups of candidate cues selected as the production cues based on which candidate cues most closely align with one or more direction elements and one or more magnitude elements of the target sportscast velocity vectors for a current waypoint of the plurality of waypoints; composing the sportscast media stream that includes the dynamically ordered audio segments and/or video segments that are produced from the production cues integrated with a live video feed and/or a live audio feed captured at the live sporting event; and streaming the sportscast media stream to one or more streaming media receivers, wherein the target sportscast velocity vectors corresponding to the plurality of waypoints individually include: the one or more direction elements that indicate to what extent sportscast content corresponding to current game state parameters within the production route model is configured to be selected, the one or more direction elements selected from inform content, insight content, entertain content, and combinations thereof; and one or more magnitude elements that indicate a relative selection priority for content corresponding respectively to the one or more direction elements.

In certain aspects, the techniques described herein relate to a method, wherein determining the production route model includes: determining initial sportscast velocity vectors for composing an ordered media stream of synthesized audio segments and/or synthesized video segments for the live sporting event occurring at a sports venue based at least in part on an event type for the live sporting event, a current game state, and a type of the sportscast media stream to be output. In one or more aspects, the techniques described herein relate to a method, wherein at least a first portion of the live event observations is derived from: a live scoreboard data feed associated with an onsite scoreboard; and/or machine recognition of scoreboard data from the live video feed captured by an onsite camera. In some aspects, the techniques described herein relate to a method, wherein at least a second portion of the live event observations is derived from a combination of: a live scoreboard data feed associated with an onsite scoreboard; and machine recognition of non-scoreboard data from the live video feed captured by an onsite camera and/or microphone.

In various aspects, the techniques described herein relate to a method, further including: organizing one or more live event observations based on time of occurrence; producing validated live event observations by performing one or more of: checking that the occurrence of the one or more live event observations is consistent with the occurrence of one or more prior validated live event observations, verifying that the occurrence of the one or more live event observations is consistent with results of machine recognition of non-scoreboard data from the live video feed captured by an onsite camera and/or microphone, checking the live event observations for compliance with a set of predetermined rules for a selected type of the live sporting event, and combinations thereof; and including the validated live event observations in the cached groups of the candidate cues indicating one or more direction elements and/or magnitude elements of the target sportscast velocity vectors from which the sportscast content is selected.

In certain aspects, the techniques described herein relate to a method, further including: performing one or more of weeding out, reordering, and postponing, of local event observation as production cue candidates which are unaligned with current production objectives as indicated by one or more direction elements of target sportscast velocity vectors for a current waypoint. In one or more aspects, the techniques described herein relate to a method, further including: modifying timing related parameters of selected live event observations for generating the production cues by performing on the selected live event observations, one or more editing operations selected from splitting, combining, truncating, deleting, lengthening, shortening, reordering, postponing, resuming, and/or combinations thereof.

In some aspects, the techniques described herein relate to a method, wherein reordering the selected live event observations includes: ordering the production cues in an order that is different from a temporally linear order indicated by timestamps of corresponding live event observations. In various aspects, the techniques described herein relate to a method, further including: determining a score for the candidate cues within the cached groups for the one or more direction elements of the target sportscast velocity vectors. In certain aspects, the techniques described herein relate to a method, further including: searching the cached groups of the candidate cues to select content for a best fit proximate production cue based on alignment of the content with current waypoint sportscast velocity vectors. In one or more aspects, the techniques described herein relate to a method, further including: sending synthesized commentary text within production cues designated for vocalization to be vocalized for inclusion in at least a portion of the dynamically ordered audio segments.

In some aspects, the techniques described herein relate to a method, wherein the production cues further include: instructions for accessing pre-generated audio segments and/or video segments. In various aspects, the techniques described herein relate to a method, further including: modifying and/or generating the precommitted content during the live sporting event, the precommitted content selected from commercial content and/or community interest content based at least in part on information derived from one or more live event observations.

In certain aspects, the techniques described herein relate to a method, wherein the precommitted content is retrieved from an ad management system based on the production cues selected to take precedence over sportscast velocity vectors for a current waypoint. In one or more aspects, the techniques described herein relate to a method, further including: composing the sportscast media stream by integrating the dynamically ordered audio segments and/or video segments that are produced from the production cues with the live video feed and/or the live audio feed at synchronization points determined based on target sportscast velocity vectors for a current waypoint.

In some aspects, the techniques described herein relate to a method, further including: streaming the sportscast media stream to one or more streaming receivers during the live sporting event. In various aspects, the techniques described herein relate to a method, further including: streaming, during the live sporting event, an audio-only version of the sportscast media stream. In certain aspects, the techniques described herein relate to a method, further including: streaming, during the live sporting event, at least a portion of the sportscast media stream to one or more audio devices and/or video devices at the live sporting event.

In one or more aspects, the techniques described herein relate to a program product including a non-transitory computer readable storage medium storing code, the code being configured to be executable by a processor to perform operations including: determining a production route model with target sportscast velocity vectors corresponding to a plurality of waypoint sportscast velocity vectors for composing an ordered stream of sportscast audio segments and/or sportscast video segments for a live sporting event occurring at a sports venue based at least on event type, game state, hosting team, and sportscast output type; caching groups of live event observations for generating production cues during the live sporting event to be composed as sportscast audio content segments and/or sportscast video content segments, the groups of the live event observations derived from scoreboard data obtained from: a live scoreboard data feed associated with an onsite scoreboard, and/or machine recognition of game state data from a live video feed captured by an onsite camera; determining the production cues to be generated from selected live event observations that are selected from the groups of the live event observations based on comparing current waypoint sportscast velocity vectors with current candidate cues; generating synthesized video content segments based on one or more of the production cues; and generating synthesized audio content segments from commentary text within selected production cues designated for vocalization, wherein the target sportscast velocity vectors corresponding to the plurality of waypoint sportscast velocity vectors individually include: one or more direction elements that indicate to what extent sportscast content corresponding to current game state parameters within the production route model is configured to be selected, the one or more direction elements selected from inform content, insight content, entertain content, and combinations thereof; and one or more magnitude elements that indicate a relative selection priority for content corresponding respectively to the one or more direction elements.

In some aspects, the techniques described herein relate to a system including: an intelligent sportscast production engine for dynamically producing a streaming sportscast of a live sporting event occurring onsite at a sports venue, the intelligent sportscast production engine including: one or more observation connectors configured to output a plurality of live event observations derived from one or more live data feeds captured onsite at the sports venue, the one or more live data feeds including: a live scoreboard data feed associated with an onsite scoreboard, and/or machine recognition of game state data from a live video feed captured by an onsite camera; an observation preprocessor configured to produce validated live event observations by performing preprocessing operations on the plurality of live event observations, the preprocessing operations including: categorizing live event observations by observation type; ordering event observations based at least in part on observation time stamps; filtering event observations, and combinations thereof; a production route planner with target sportscast velocity vectors corresponding to a plurality of waypoint sportscast velocity vectors configured to select and determine an order of production cues including synthesized audiovisual content segments based on current waypoint sportscast velocity vectors of the plurality of waypoint sportscast velocity vectors and live action to sportscast latency, wherein the production route planner is further configured to cause vocalization of synthesized commentary text within selected production cues designated for vocalization; and a media composer configured to output a sportscast media stream by integrating the live video feed and/or a live audio feed with the synthesized audiovisual content segments in the order determined by the production route planner, wherein at least a portion of the observation connectors, the observation preprocessor, the production route planner, and the media composer includes one or more of a set of hardware circuits, a set of programmable hardware devices, and executable code stored on a set of non-transitory computer-readable storage media, and wherein the target sportscast velocity vectors corresponding to the plurality of waypoint sportscast velocity vectors individually include: one or more direction elements that indicate to what extent sportscast content corresponding to current game state parameters within the production route planner is configured to be selected, the one or more direction elements selected from inform content, insight content, entertain content, and combinations thereof; and one or more magnitude elements that indicate a relative selection priority for content corresponding respectively to the one or more direction elements.

BRIEF DESCRIPTION OF THE DRAWINGS

A more particular description of the examples and/or implementations briefly described above will be rendered by reference to specific examples and/or implementations that are illustrated in the appended drawings. Understanding that these drawings depict only some examples and/or implementations and are not therefore to be considered to be limiting of scope, the examples and/or implementations will be described and explained with additional specificity and detail through the use of the accompanying drawings, in which:

FIG. 5 is a schematic block diagram illustrating a pregame starting lineups media segment featuring localized player level audiovisual content integrated with live-captured video and/or audio streams, according to one or more examples of the present disclosure;

DETAILED DESCRIPTION

Figure 1:
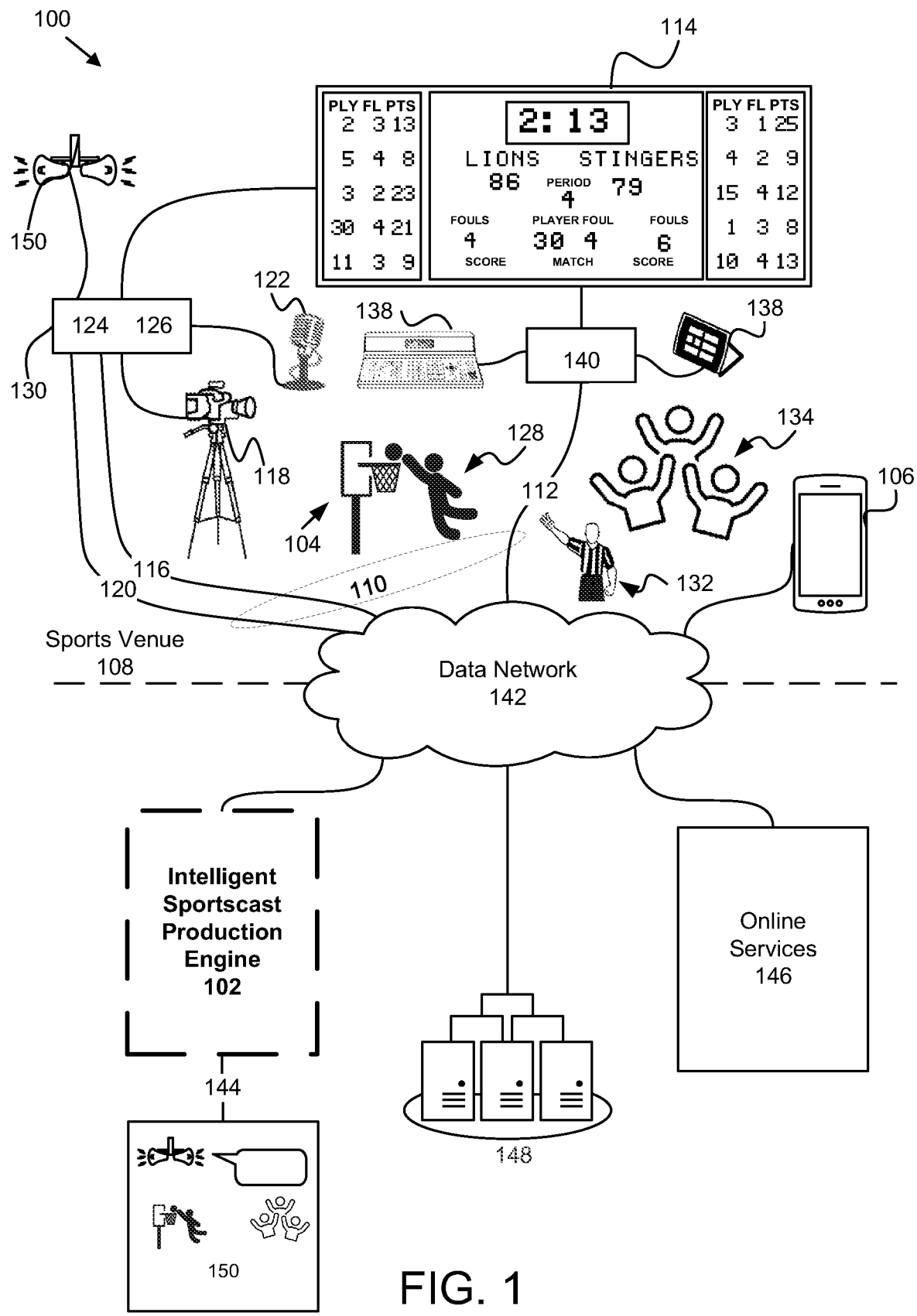
FIG. 1 is a schematic block diagram illustrating a system for intelligent sportscast production for enhanced streaming of a live sporting event, according to one or more examples of the present disclosure.

As will be appreciated by one skilled in the art, aspects of the examples and/or implementations may be embodied as a system, method, or program product. Accordingly, examples and/or implementations may take the form of an entirely hardware examples and/or implementations, an entirely software examples and/or implementations (including firmware, resident software, micro-code, etc.) or an examples and/or implementations combining software and hardware aspects that may all generally be referred to herein as a "circuit," "module" or "system." Furthermore, examples and/or implementations may take the form of a program product embodied in one or more computer readable storage devices storing machine readable code, computer readable code, and/or program code, referred hereafter as code. The storage devices, in some examples and/or implementations, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for examples and/or implementations may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one examples and/or implementations," "an examples and/or implementations," or similar language means that a particular feature, structure, or characteristic described in connection with the examples and/or implementations is included in at least one examples and/or implementations. Thus, appearances of the phrases "in one examples and/or implementations," "in an examples and/or implementations," and similar language throughout this specification may, but do not necessarily, all refer to the same examples and/or implementations, but mean "one or more but not all examples and/or implementations" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the examples and/or implementations may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples and/or implementations. One skilled in the relevant art will recognize, however, that examples and/or implementations may be practiced without one or more of the specific details, or with other methods, components, materials, and so forth. In other instances, well-known structures, materials, or operations are not shown or described in detail to avoid obscuring aspects of an examples and/or implementations.

Aspects of the examples and/or implementations are described below with reference to schematic flowchart diagrams and/or schematic block diagrams of methods, apparatuses, systems, and program products according to examples and/or implementations. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples and/or implementations.

In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples and/or implementations. Indeed, some arrows or other connectors may be used to indicate only the logical flow of the depicted examples and/or implementations. For instance, an arrow may indicate a waiting or monitoring period of unspecified duration between enumerated steps of the depicted examples and/or implementations. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples and/or implementations of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single items in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a schematic block diagram illustrating a system 100 for intelligent sportscast production for enhanced streaming of a live sporting event. 104, according to one or more examples of the present disclosure. In various implementations, the system 100 includes one or more modules such as an intelligent sportscast production engine 102 for dynamically producing an enhanced streaming sportscast of a live sporting event 104 occurring onsite at a sports venue 108. In some implementations, other modules such as the one or more camera interfaces 124, one or more microphone interfaces 126, and one or more scoreboard interfaces 140, may be implemented in hardware, software, and/or a combination of hardware and software.

The intelligent sportscast production engine 102 processes data pertaining to one or more live data feeds 110 captured onsite at the sports venue 108. The one or more live data feeds 110 include a live scoreboard data feed 112 associated with an onsite scoreboard 114 and one or more live video feeds 116 captured by one or more onsite video cameras 118. In some implementations, the one or more live data feeds 110 further include one or more live audio feeds 120 associated with one or more onsite microphones 122. In various implementations, one or more live data feeds 110 are mixed or otherwise processed by one or more pieces of audiovisual equipment 130, such as for example, audio and/or video mixers or consoles.

The one or more live data feeds 110 electronically capture live sounds and/or images of the sports venue 108, sports equipment, players 128, sports officials 132, spectators 134, and/or other participants. In some implementations, the one or more live data feeds 110 may feed data from mobile devices 106.

In some examples, the system 100 may include one or more onsite video cameras 118, one or more onsite microphones 122, and/or audiovisual equipment 130 (such as an audiovisual console or mixer), which may be used for capturing and/or electronically communicating one or more live data feeds 110 such as a live scoreboard data feed 112 associated with an onsite scoreboard 114 and one or more live video feeds 116 captured by one or more onsite video cameras. In some examples or implementations, the one or more live data feeds include one or more live audio feeds 120 from one or more onsite microphones 122 that are integrated with the one or more onsite video cameras 118 and/or from one or more onsite microphones 122 that may be separate from the one or more onsite video cameras, such as for example, a broadcast microphone.

In various implementations, the intelligent sportscast production engine 102 receives a live scoreboard data feed 112 from a scoreboard interface of the one or more scoreboard interfaces 140 that has a universal scoreboard interface for connecting to one of the one or more onsite scoreboards 114 and/or a scoreboard controller 138. Additionally, in some implementations the intelligent sportscast production engine 102 receives one or more live video feeds 116, such as for example from one or more camera interfaces 124. and one or more live audio feeds from microphone computer vision recognize/derived data and events, from a camera interface of the one or more camera interfaces 124. Although the one or more camera interfaces 124 and the one or more microphone interfaces 126 are depicted as individual interfaces they may be combined in some implementations, and they may also include interfaces to more than one camera or other video source and more than one microphone or other audio source. In certain implementations, computer recognition of items of interest in the one or more live video feeds 116 and/or the one or more live audio feeds 120 may be performed internally in the recognition module 230 and/or may also be performed externally to intelligent sportscast production engine 102.

In certain implementations, the one or more scoreboard interfaces 140 includes touchscreen controls and wireless or wired connections to the data network 142 and/or to one or more onsite scoreboards 114. In certain implementations, the one or more scoreboard interfaces 140 are devices separate from the one or more onsite scoreboards 114 and use a scoreboard cable that connects to numerous types of scoreboard output ports. This enables some or all of the one or more scoreboard interfaces 140 to connect to legacy scoreboards already installed in sports venues, such as for example high schools, middle schools, colleges, and so forth. Examples of the one or more scoreboard interface 140 include the Sportzcast ScoreHub by Genius Sports Group Limited, London, England. In some examples, the scoreboard controller 138 and in the scoreboard interface 140 are implemented in an app on a mobile device such as, for example, a tablet. One example of an app-based scoreboard controller/data hub implemented using a tablet as an interface to cloud services is available from Scorevision, LLC of Omaha, Nebraska.

In various examples, the one or more onsite video cameras 118 may include consumer camcorders, action cameras, television cameras, automated production cameras, smart phone cameras, tablet cameras, web cameras, or the like. In various examples, the one or more onsite video cameras 118 and/or corresponding integrated microphones and communicate data to the audiovisual equipment 130 through a wired connection and/or a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE_802 standard. In one examples and/or implementations, the wireless connection employs a Z-Wave© connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

In various implementations, the intelligent sportscast production engine 102 connects through the data network 142 to online services 146, such as for example, ad management services, content services, vocalizer services, and so forth, which are described in more detail below with respect to FIG. 2. In certain examples, one or more of the processing services are included in the system 100. In some implementations, certain processing services are provided by third parties and exchange information with the system 100.

The system 100 in various examples includes one or more processors 148 that are configured to access a non-transitory computer readable storage medium storing code that is configured to perform various programmed actions of the methods described in the present disclosure. In some examples, the one or more processors 148 may be distributed processors and/or may be processing services that are dynamically allocated as a network accessible resource. In various examples, the one or more processors 148 provide processing for the intelligent sportscast production engine 102.

In various implementations, the programmed actions described herein with respect to the systems, apparatuses, methods, program products or subcomponents thereof such as modules, engines, data connectors, apparatuses, and of the present disclosure are performed by one or more serverless, event-driven compute services. For example, in certain implementations, the programmed actions described in the methods of the present disclosure using stream processing performed by serverless computing services such as Amazon Kinesis® to process audio feeds, video feeds, and so forth as described and depicted in more detail below with respect to FIG. 2.

In some examples, certain trigger conditions such as detection of data indicating a live event observation is processed by a process that is part of an event driven compute function service, such as for example, Amazon Web Services (AWS) Lambda®. In other implementations, at least a portion of such actions are performed by processors in personal computers, laptops, tablets, embedded processors, virtual processors, and/or remote servers.

The system 100 for intelligent media production for enhanced streaming of a live sporting event provides various improvements in sportscast technology. For example, by using a modular architecture with a production route planner that dynamically updates sportscast velocity vectors, the system 100 is configured to synergistically enhance stakeholder experience during the live sporting event by selecting, editing, and/or reordering live event observations derived at least in part from a live scoreboard data feed associated with an on-site scoreboard. The system 100 is further configured to provide rapid production of an informative, insightful, entertaining, sportscast media stream of the live sporting event that also accommodates precommitted content by synthesizing audio content and/or video content based on production cues using selected live event observations. Various other improvements over existing sportscast technology provided by the systems, methods, program product, and apparatuses disclosed herein are described in more detail below.

Figure 2:
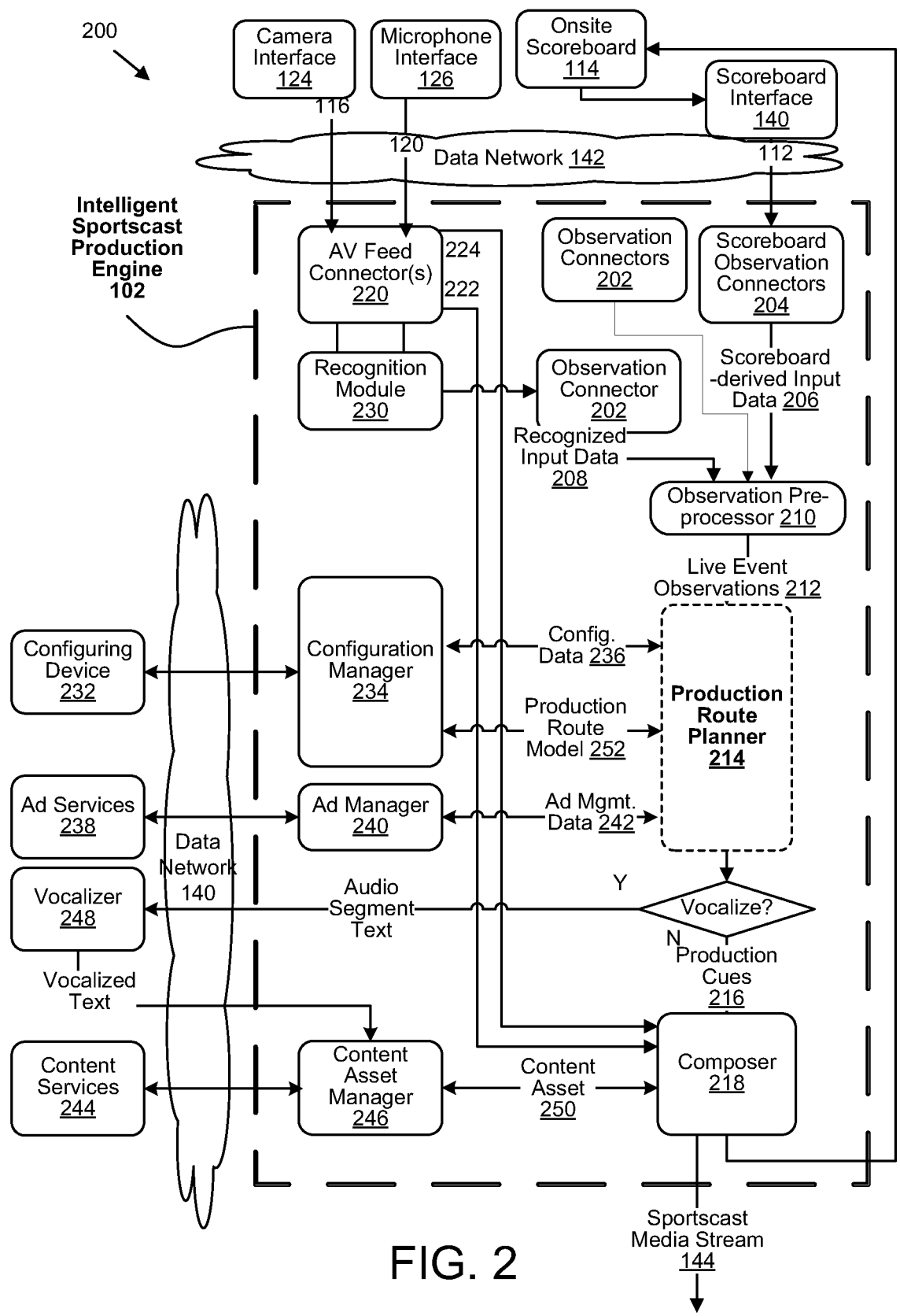
FIG. 2 is a schematic block diagram illustrating an intelligent sportscast production engine, according to one or more examples of the present disclosure.

FIG. 2 is a schematic block diagram of an apparatus 200 for intelligent sportscast production for enhanced streaming of a live sporting event that includes an intelligent sportscast production engine 102, according to one or more examples of the present disclosure. The intelligent sportscast production engine 102 improves the functionality of systems for sportscast streaming by providing a flexible real-time or near real-time production system that utilizes a production route model to determine the type, length, and order of synthesized or pre-generated audio segments and/or video segments derived from live event observations such as scoring, penalties, closeness of the game, will be included in a final production of a sportscast media stream.

In various example implementations, the intelligent sportscast production engine 102 implemented as one or more modules that include other modules. In some implementation, the intelligent sportscast production engine 102 includes one or more instances of the following modules-observation connectors 202, including for example, scoreboard observations connectors 204, AV feed connectors 220 observation preprocessor 210, production route planner 214, composer 218, the recognition module 230, configuration manager 234, Ad manager 240, and/or content asset manager 246. In certain implementations, one or more modules, such as for example, configuring device 232, ad services 238, vocalizer 248, and/or content services 244 may be implemented as part of the system 100 and may communicate with the intelligent sportscast production engine 102 via data network 142. It may be noted that the partitioning and naming of the modules may be different than the implementations depicted in FIG. 2 while still providing similar structures and functions.

In some implementation, the intelligent sportscast production engine 102 includes one or more observation connectors 202, and one or more audio feed and/or video feed connectors depicted collectively as AV feed connectors 220. It may be noted that in this context, the term "connector"

refers to a module that performs transfer of control and data between external components such as one or more live video feeds 116 and/or one or more live audio feeds 120 from the camera and/or microphone interfaces of the audiovisual equipment 130 that may exist outside the intelligent sportscast production engine 102 and internal or downstream components that are configured to use control and data in a predetermined format. In certain example implementations, other types of connectors may be used to adapt data from different external interfaces for consumption by internal modules such as recognition module 230, or observation preprocessor 210 (also referred to as an observation sorter).

The AV feed connectors 220 receive data from one or more camera interfaces 124 (which in some implementations may also be referred to as video interfaces since video can come from devices other than cameras) and one or more microphone interfaces 126 may also be referred to as audio interfaces since audio may come from devices other than microphones. In certain implementations, the one or more camera interfaces 124 and the one or more microphone interfaces 126 receive integrated audiovisual data from one or more video cameras with sound such as one of the one or more onsite video cameras 118 depicted in FIG. 1.

In some examples, the one or more camera interfaces 124 and the one or more microphone interfaces 126 respectively receive video data from multiple video sources such as a high wide shot camera that follows most of the action, a focus camera that captures close-ups and scoring, and running camera that captures crowd shots or different angles of the game action. The one or more microphone interfaces 126 may likewise capture audio data from multiple cell sources sound sources such as one or more onsite microphones 122 for an announcer, an arena or crowd microphone, a wireless lapel mic on an official, or various other sound sources from microphones, sound systems, amplifier. Depending on the number and type of video sources and/or audio sources, AV feed connectors 220 may be utilized with different instances for different types of audio and/or video sources.

As mentioned above, in some implementations, the intelligent sportscast production engine 102 includes a recognition module 230 for recognizing particular data objects within the video feed 222, the audio feed 224.

For example, the recognition module 230 may include a vision processing unit (VPU) that is a special type of artificial intelligence accelerator designed to accelerate machine vision tasks. In some cases, recognition by computer vision may be performed by multiple vision processing units implemented as cloud services.

In some implementations, live event observations that drive the direction of synthesized audio segments and/or video segments are derived from a live scoreboard data feed associated with an onsite scoreboard 114 and/or machine recognition of game state data from a live video feed captured by an onsite camera.

As used herein the term "game state" refers to parameters and values for display on the scoreboard for an active event. In various example implementations, game state and/or game state data include data or information for which values corresponding to a predetermined placeholder on an onsite scoreboard relevant to the active sporting event are configured to be updated during the sporting event.

For example, game state and/or game state data may include: sporting event type information (e.g., type of sport such as basketball, soccer, baseball, football, and so forth); active scoring information (active score, scoring event time e.g., such as three point shot, two point shot, one point shot, 1 extra point, 2 extra points, field goal, touchdown, runs, down number); active timekeeping information (e.g., start time, end time, current time, time remaining, timeout, timeouts remaining, clock stopped, clock started, inning, period, half; active team information: home and away/visitor, team name, active players, and so forth); active penalty and play status information (e.g., player fouls, team fouls, balls, strikes, yards to first down, first serve, second serve, ball in, ball out, and the like).

Unless otherwise clear from context, information related to active play, but which does not fall within the category of values for one or more predetermined placeholders on a scoreboard are configured to be updated during the sporting event, would generally not be considered game state information. For example, in a basketball game, a layup and a slam dunk are different types of basketball shots that are both counted as two points. However, one does not generally find a predetermined placeholder on onsite scoreboards for indicating whether a particular shot was a layup or a slam dunk.

Similar examples are found in various sports other than basketball. For example, in a soccer game, the referee holding up a red card, yellow card, etc., would generally not be expected to be coming from a live scoreboard data feed 112 but a live event observation 212 could come from recognition of a red card or a yellow card in one or more live video feeds 116 by a recognition module 230 that provides data to a corresponding observation connector 202 that outputs live event observations based on recognized input data 208 to the observation preprocessor 210.

In another example from a volleyball game, the live scoreboard data feed would most likely not indicate that the play was stopped due to a player touching the net. For American football, the live scoreboard data feed 112 would most likely not indicate the exact penalty that caused the team on offense to be pushed back 15 yards (could be unsportsmanlike conduct, roughing the passer, etc.). Nevertheless, game state and/or scoreboard data, may be combined with other types of information to produce a live event observation.

Referring again to the observation connectors 202, one or more of the observation connectors 202 may be a scoreboard observation connector 204 that derives live event observations from a live scoreboard data feed 112 from a scoreboard interface 140 or scoreboard interfaces associated with an onsite scoreboard 114. In certain implementations, a scoreboard observation connector 204 may derive live event observations from a live scoreboard data feed that communicates directly with an onsite scoreboard 114.

Live event observations 212 derived from an onsite scoreboard may be derived from any data displayed on an onsite scoreboard as well as data that is sent to or received from an onsite scoreboard whether the data is numerical, textual, image data, logical data and so forth. Scoreboard observation connectors 204 or other observation connectors 202 is depicted as scoreboard-derived input data 206.

A change in score is an example of a live event observation that may be derived from a live scoreboard data feed whether the data is being sent to the scoreboard, or the data is coming from the scoreboard. Score-related data is only one of the many types of data that may be associated with an onsite scoreboard. Live scoreboard data feeds may also include (without limitation) data related to the players, teams, game timing, timeouts, fouls/penalties, league information, team record/standing/rank, and so forth.

In some instances, live event observations 212 may be derived from a data feed other than a live scoreboard data feed such as for example a live video feed and/or a live audio feed captured onsite at the live sporting event. In certain implementations, a recognition module 230 is used to process the video feeds 222 and/or audio feeds 224 to produce recognized input data 208 from which live event observations 212 may be derived.

For example, in some venues, scores and other scoreboard data are displayed on an onsite four-digit manual flip scoreboard in which cards with score digits may be flipped to update the score. A recognition module 230 may process a video feed 222 in which an image of the manual flip scoreboard is displayed and may use computer vision to recognize and update the current score for use as recognized input data 208. Thus, various types of manual and/or electronic scoreboards may be used to provide a live scoreboard data feed as scoreboard-derived input data 206.

Moreover, in certain implementations, a combination of live event observation input data from the recognition module and or live event observation input data from scoreboard observation connectors 204 may be used in combination to derive live event observations.

For example, in a simplified basketball game example, an electronic scoreboard data feed might indicate that a two-point basketball shot has been made and that scoreboard-derived input data 206 could be used to derive live event observations 212 which are used to produce a synthesized audio segment and/or a synthesized video segment that communicates the updated score audibly and/or visually.

In a more advanced basketball game example, recognized input data 208 is output from computer vision processing of the video feed 222 is implemented in the recognition module 230. The computer vision may recognize not only that a two-point shot has been made from an image of the scoreboard but may also recognize the team and player number of the player who made the shot. Furthermore, the computer vision may further recognize that the two-point shot was a slam dunk in which the player making the dunk jumped over the opposing center and broke the backboard.

In this context, the live event observation triggered by the combination of scoreboard-derived input data 206 from the live scoreboard data feed 112 and recognized input data 208 from the recognition module 230 having used computer vision to recognize data with a much higher excitement or entertainment value than merely score information can be used to significantly enhance the production quality of the sportscast media stream by enabling the synthesized audio to include excited commentary text about the score itself plus follow-up text about the exciting performance of the player who made the slam dunk and historical data comparing this particular slam dunk with similar slam dunks retrieved during the game from online content libraries.

In one or more example implementations, the production route model 252 includes initial sportscast velocity vectors configured to be converted to target sportscast velocity vectors for a current waypoint based on a game state of a live sporting event. Using the connector architecture with various types of connectors enables intelligent sportscast production engine 102 to flexibly connect with a wide range of onsite scoreboard types, audio and video feeds, and other data providers through a data network 142 that is wired or wireless.

In certain implementations, the intelligent sportscast production engine 102 determines, (e.g., generates, selects, adjusts, and/or combinations thereof) a production route model that includes initial sportscast velocity vectors for composing an ordered media stream of synthesized audio segments and/or synthesized video segments for a live sporting event occurring at a sports venue based at least in part on an event type for the live sporting event, a game state, and a type of sportscast media stream to be output.

In various examples, the intelligent sportscast production engine 102 is configured to output a sportscast media stream 144 as depicted in FIG. 1 and FIG. 2. In certain examples, the sportscast media stream 144 is "broadcast-ready" referring to media output that is fully produced or finished for streaming with a quality level suitable for being included in normal TV broadcasting and/or web streaming. It may be noted that the quality level suitable for being included in normal TV broadcasting and/or web streaming typically improves over time, and such improvements may be implemented consistently with the systems of apparatuses and methods described herein. In other words, the systems, apparatuses, and methods described herein may be implemented with high production values.

Some event types for which production route models may be generated, selected, and/or adjust, include, for example, aquatics, baseball, basketball, cricket, American football, hockey, horse racing, lacrosse, soccer, softball, tennis, track, volleyball, wrestling, rodeo, motorsports, pickleball, jai alai, and so forth.

Both the initial sportscast velocity vectors and the target sportscast velocity vectors for various waypoints include one or more sportscast direction elements that indicate to what extent sportscast content corresponding to current game state parameters within the production route model is configured to be directed to one or more predetermined content types selected from inform content, insight content, entertain content, precommitted and/or combinations thereof.

In various examples, the production route planner 214 includes an ad manager 240 that accesses ad data 242 from one or more online advertising services also known as ad services 238. In certain examples, the ad data 242 includes precommitted content such as advertisements, community interest items, announcements, which are described in more detail below with respect to FIG. 3.

Advantageously, the sportscast media stream 144 output by the intelligent sportscast production engine 102 is composed using dynamically ordered audio segments and/or video segments that are synthesized using live event observations and/or sportscast velocity vectors that include magnitude and direction elements for a plurality of production values.

In some examples, intelligent sportscast production engine 102 may communicate with a vocalizer 248. The vocalizer 248, in certain examples, may be implemented as a third-party cloud-based service, a third-party app integration. In other examples, the vocalizer 248 may be implemented locally as a module that includes software, hardware, or a combination of both.

In one or more examples, the intelligent sportscast production engine 102 streams the sportscast media stream 144 to one or more streaming receivers 150 during the live sporting event. For example, streaming receivers 150 may include devices such as flat-panel displays, televisions, audio players, computers, tablet, smartphone, and so forth.

In certain such implementations, the production route planner 214 is configured to select and determine an order of production cues 216 comprising synthesized audiovisual content segments based on target sportscast velocity vectors for a current waypoint and live action to sportscast latency, wherein the production route planner is further configured to cause vocalization of synthesized commentary text within selected production cues designated for vocalization In certain implementations, the intelligent sportscast production engine 102 streams an audio-only version of the sportscast media stream.

Figure 3:
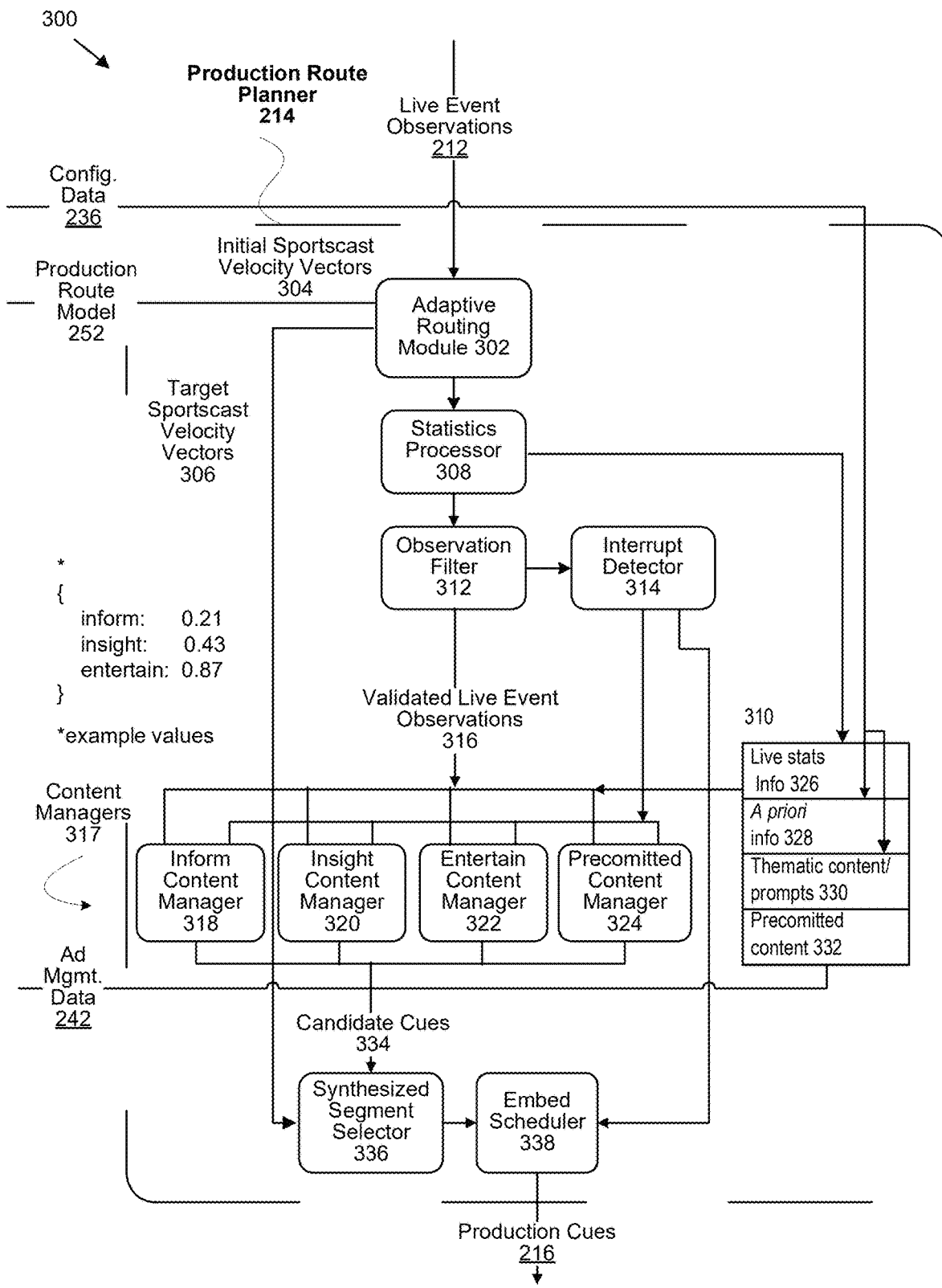
FIG. 3 is a schematic block diagram illustrating a production route planner that uses sportscast velocity vectors, according to one or more examples of the present disclosure.

FIG. 3 is a schematic block diagram illustrating an apparatus 300 comprising a production route planner 214, according to one or more examples of the present disclosure. As shown at a high level in FIG. 2, in various example implementations, the production route planner 214 is configured to produce a consumable, ordered stream of production cues 216 given a stream of live event observations 212. The production cues 216 are associated with selected live event observations 212 which indicate to downstream components when audio content and/or video content corresponding to is relevant to be inserted. There are a number of different types of production cues 216 which are intended to cause different effects during production such as triggering integration of graphic overlays, instant audio/video replays, vocalized synthesized commentary, and so forth. In various examples, the production cues 216 that are output by the production route planner 214 are configured to be integrated by the composer 218 into the final composition of the sportscast media stream 144.

Moreover, in order to facilitate real-time or near real-time production, the production route planner 214 is configured to handle timing concerns for the production cues and therefore is also configured to weed out, reorder, postpone, local event observation as production cue candidates which are either not viable, not relevant, or simply not in line with the current production objectives as indicated by one or more direction elements of target sportscast velocity vectors 306 for a current waypoint.

FIG. 3 depicts in more detail various modules and functions that are included in the production route planner 214 in one or more examples. In various implementations, the production route planner 214 includes one or more instances of the following modules: an adaptive routing module 302, a statistics processor 308, an observation filter 312, an interrupt detector 314.

In one or more implementations, the production route planner 214, includes other modules that act as content managers, such as for example, an inform content manager 318, an insight content manager 320, an entertain content manager 322, and a precommitted content manager 324.

In some implementations, the production route planner 214 further includes multiple content caching modules 310 such as live stats info caches 326, a priori info caches 328, thematic content caches 330 (also referred to as thematic content prompts) and/or precommitted content caches 332 that act as caches or stores for storing information that may be selected for inclusion in production cues 216. In various implementations, the content caching modules 310 store multiple types of data relating to particular content types such as content data including text, audio, video and so forth, indexing data, scoring data for comparing the content in the content caching modules 310 to the target sportscast velocity vectors 306.

In certain implementations, the production route planner 214 includes modules such as a synthesized segment selector 336 and an embed scheduler 338. Various of the foregoing modules are described in more detail below.

The adaptive routing module 302 receives or accesses a production route model 252 which includes initial sportscast velocity vectors 304. The production route model 252, in one or more implementations, is input as part of the configuration data 236 that is communicated prior to the live sporting event by a configuring device 232. The adaptive routing module 302 determines target sportscast velocity vectors 306 based on the initial sportscast velocity vectors and in certain instances also based on live event observations 212. For example, when a live event observation 212 is deemed by the rules implemented for the adaptive routing module 302 to be surprising, unexpected, exciting, etc., the adaptive routing module 302 may depart from the typical production route model 252 for the particular type of sporting event.

One example of a live event observation 212 that may prompt the production route model 252 to vary from initial sportscast velocity vectors 304 would be a serious injury on the field or on the court. If the initial sportscast velocity vector for the waypoint at that particular portion of the game were directed more strongly towards insight content or entertain content, the adaptive routing module 302 may increase the magnitude for the inform direction for the target sportscast velocity vectors for the current waypoint to be directed more strongly towards inform content to provide a streaming audience with more information about who got hurt, how did they get hurt. In such a situation, the adaptive routing module 302 may also adjust increase the magnitude for the insight direction for the target sportscast velocity vectors for the current waypoint in order to provide commentary about what the injury could mean for the individual player and/or the team.

In the injury scenario, the adaptive routing module 302 may also be configured to lower the magnitude of all directions in the target sportscast velocity vectors so that synthesized segments selectors 336 will be triggered to select precommitted content coming from the precommitted content manager 324. For example, if the live sporting event is a soccer game the referee may call for injury time (also referred to as stoppage time). The referee may at her discretion add in from one to six minutes of stoppage time at the end of either half of the game to compensate for minutes lost due to goal celebrations, substitutions, files, injuries, time wasting, and crowd problems.

The target sportscast velocity vectors 306 are communicated to various content manager modules such as for example, the inform content manager 318, the entertain content manager 322, the insight content manager, and the precommitted content manager 324.

The live stats info caches 326 cache game statistics information. Many game stats are derived from live event observations 212 that originated at least in part from scoreboard-derived input data 206 as shown in FIG. 2. The live game stats module may also store or use artificial intelligence to generate textual or JSON commands for audio commentary to be included together with the statistical information e.g., points scored, team scores, players, etc., Training sets for generating the supporting content for a given live event observation may be taken from a corpus of transcripts of sportscasts for the relevant sporting event type.

For example, a set of initial sportscast velocity vectors with two minutes left in the final period of play may be based on a production plan that predicts that scores of the opposing teams will be relatively close to each other. When the score is close, it may be more important to generate short form audio and/or video content that provides frequent informative data such as score updates, tells which team and player scored, or accelerates the tempo and excitement (e.g., magnitude) of entertain type content by playing crescendoing organ notes, having the home team cheer squad and crowd shout "defense! defense!"

However, if there are only two minutes left in the game and that home team is ahead by 30 points, the adaptive routing module may dynamically update the sportscast velocity vectors to allow more long form content such as insights about the next game, or more precommitted content since the sportscast audience will have less apprehension about the outcome of that game.

If the home team or sportscast sponsoring team is winning, the nature of long form audio and/or video content selected may be more celebratory or may be more focused on what winning the game will mean for future games such as playoff games. On the other hand, it the home team or sportscast sponsoring team is losing by a practically insurmountable margin, the nature of long form audio and/or video content selected may be chosen to reflect disappointed for the loss and hope for a goal of bouncing back next game or next season.

In various examples, different instantiations of the intelligent sportscast production engine 102 and/or components thereof may be implemented to provide different sportscast media streams specifically adapted to particular audiences. For example, a first instantiation of the intelligent sportscast production engine 102 may be configured to provide a sportscast media stream for the home team for a particular sporting event and a second instantiation of the intelligent sportscast production engine 102 may be configured to provide a different sportscast media stream for the away team.

In such implementations, certain of the modules may be duplicated and expanded using web-based compute services so that data feeds from the same onsite scoreboard, cameras and microphones can be used for multiple target audiences. Other examples illustrating the tremendous value of the disclosed systems, apparatuses, and methods may include providing multiple synthesized audio streams and/or video streams with different languages for different audiences. In another example, certain instantiations of the intelligent sportscast production engine 102 may be configured to provide voice only audio streams and other implementations may be configured to generate video streams with synthesized subtitles and/or picture in picture sign language interpretations.

FIGS. 4, 5, 6, 7, 8, 9, 10, 11, and 12, illustrate various "use case" contexts for audio segments and/or video segments that may be integrated into the sportscast media stream 144 by the production route planner 214 and/or the composer 218 in accordance with a production route model 252 four a particular live sporting event. Many of the illustrations are depicted in the context of a high school or collegiate basketball game. However, the intelligent sportscast production engine 102 may be configured to accommodate any desired type of live sporting event.

In the description of the use case illustrations depicted in FIGS. 4-12 reference to one or more components with or without accompanying reference numbers of the intelligent sportscast production engine 102, the production route planner 214, or components thereof may be made without directly referencing the particular figures in which such components are first depicted and described. In general, the first of a reference number for particular complement may correspond to the figure in which the particular component is first depicted and described. For example, the intelligent sportscast production engine 102 begins with the numeral '1' and is first depicted in FIG. 1. Although various portions of this disclosure follow this numbering convention, is not intended to be an absolute rule nor to supersede numbering which is implemented otherwise.

Figure 4:
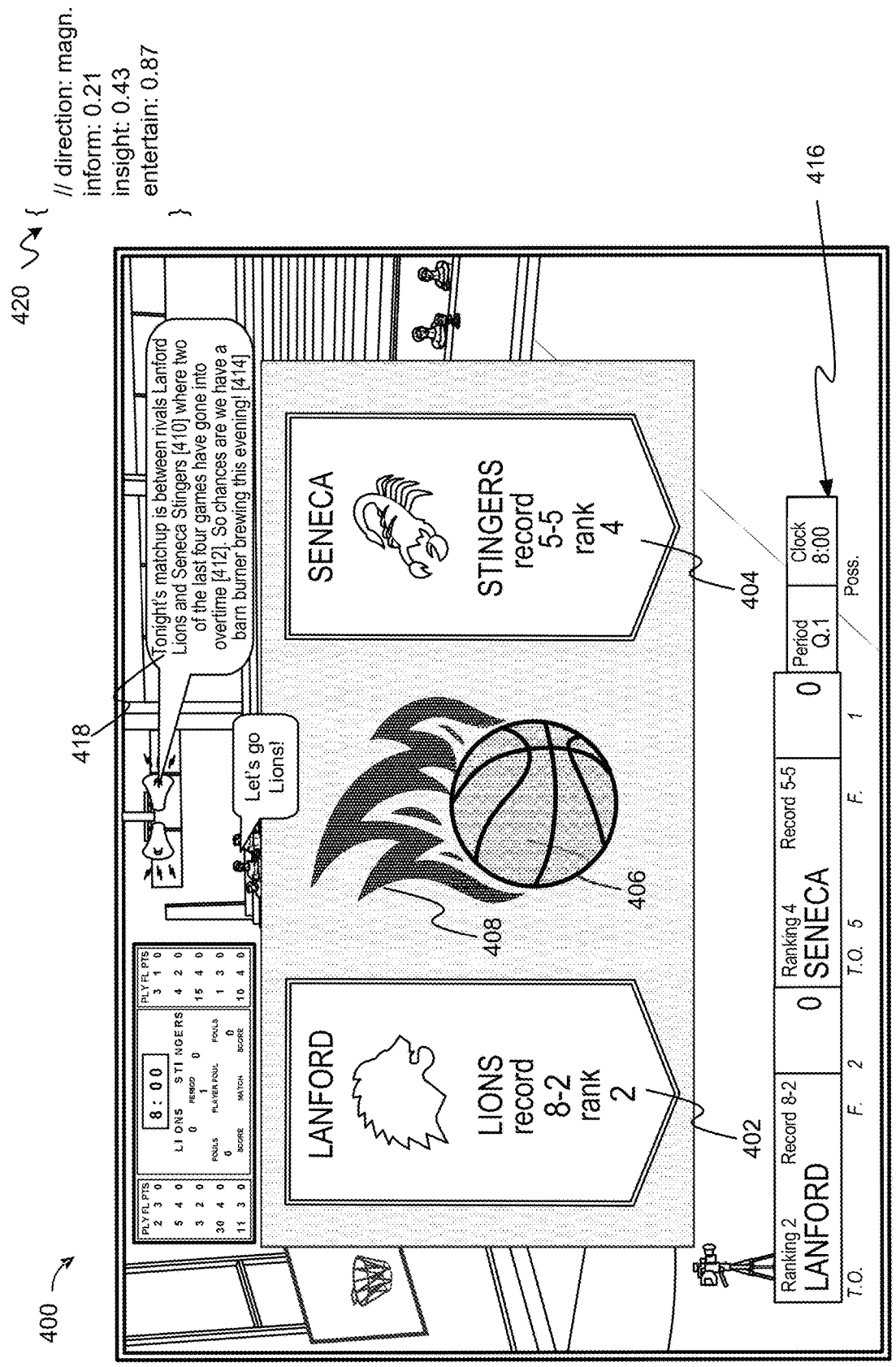
FIG. 4 is a schematic block diagram illustrating a pregame team introduction media segment featuring localized team level audiovisual content integrated with live-captured video and/or audio streams, according to one or more examples of the present disclosure.

FIG. 4 is a schematic block diagram illustrating a media segment 400 featuring localized team level video content segments 402, 404, 406, 408, and audio content segments 410, 412, 414 integrated with live-captured video 416 and/or audio streams 418, according to one or more examples of the present disclosure.

The integrated sportscast media segment 400 is depicted as taking place prior to the start of a live sporting event that is a basketball game. At this point in the live sporting event, the rate of live event observations being derived from a scoreboard data feed for an on-site scoreboard is relatively low due to the fact that gameplay has not started and therefore there are no live event observations based on changes in score.

In the depicted example, one of the production objectives at this point in the sportscast is to get the audience engaged and excited about the upcoming game. Because relatively few live event observations are being derived from the scoreboard data feed for an on-site scoreboard or from recognized video and/or audio objects, the magnitudes of different directions (e.g., inform, insight, entertain, and promote) for the target sportscast velocity vectors 420 may be mathematically relatively similar to the predetermined sportscast velocity vectors provided in the production route model 252 as depicted in FIG. 3. In other words, the production route model is generally being followed as planned with no detours or obstacles requiring major changes in the target sportscast velocity vectors.

Yet, certain live event observations may be derived from scoreboard data streams and most of the candidate content are generating production cues. For example, the inform vector direction has a magnitude for this waypoint of 0.21 which is compared by the synthesized segment selector 336 with inform ratings for cached content of which at least some of the synthesized audio content segments (e.g., vocalized commentary) and/or video content segments (e.g., graphical overlays) may be derived from the scoreboard data feed. In other words, depending on which waypoints the production route segments are between, whether the candidate cues 334 are derived from scoring-related validated live event observations 316 or other informative content may be influenced by the respective types of content managers 318, 320, 322, 324 selecting suitable content having from one or more of the content caching modules 310.

The synthesized audio content segments 410, 412, 414 include text from the live event observations together with live info, a priori information and theme content or prompt information that is configured to generate engaging and nonrepetitive phrases that surround textualized inform content. The objective facts encoded in the live event observations are included in the phrase in the audio content segment 410 that the matchup is being held tonight, between the rivals Lanford Lions and the Seneca Stingers.

Next, a phrase corresponding to insight content direction is selected. The insight content provides information that is generally not displayed in a predetermined portion of an onsite scoreboard. In this case, the phrase 412 "where two of the last four games have gone into overtime" is derived from a priori information about the prior games between the two teams. A third phrase 414 "so chances are, we have a barnburner brewing this evening!" is selected based on the relatively high magnitude of the entertain direction of the target sportscast velocity vector 420.

In various implementations, at periods of time between waypoints where there is relatively little game action, it may be deemed better to first select inform content so that the audience knows high level facts about the upcoming matchup, second, to provide some insight that sets the stage for a more flamboyant content segment. Furthermore, if there are relatively few live event observations being generated by changes in game state, the synthesized segment selector 336 may be programmed to prioritize any precommitted content 332 available from the precommitted content manager 324 ahead of inform, insight, or entertain content, especially where the precommitted content includes time-based or waypoint based rules such as this promotional content needs to play prior to beginning of game play such as tipoff, kickoff, etc. book Notably, the production route planner 214 can synthesize audio content and graphical overlay content that enhance the entertain content magnitude. For example, an image of a basketball may be commonly selected as a default graphic overlay 406 for a basketball game. However, to enhance the entertain magnitude, an additional graphic overlay 408 of flames is depicted above the basketball in such a way that both the entertain synthesized audio segment and the graphical overlay of the flame above basketball graphic reinforce the concept model of an exciting (i.e., burning hot) game.

Figure 5:
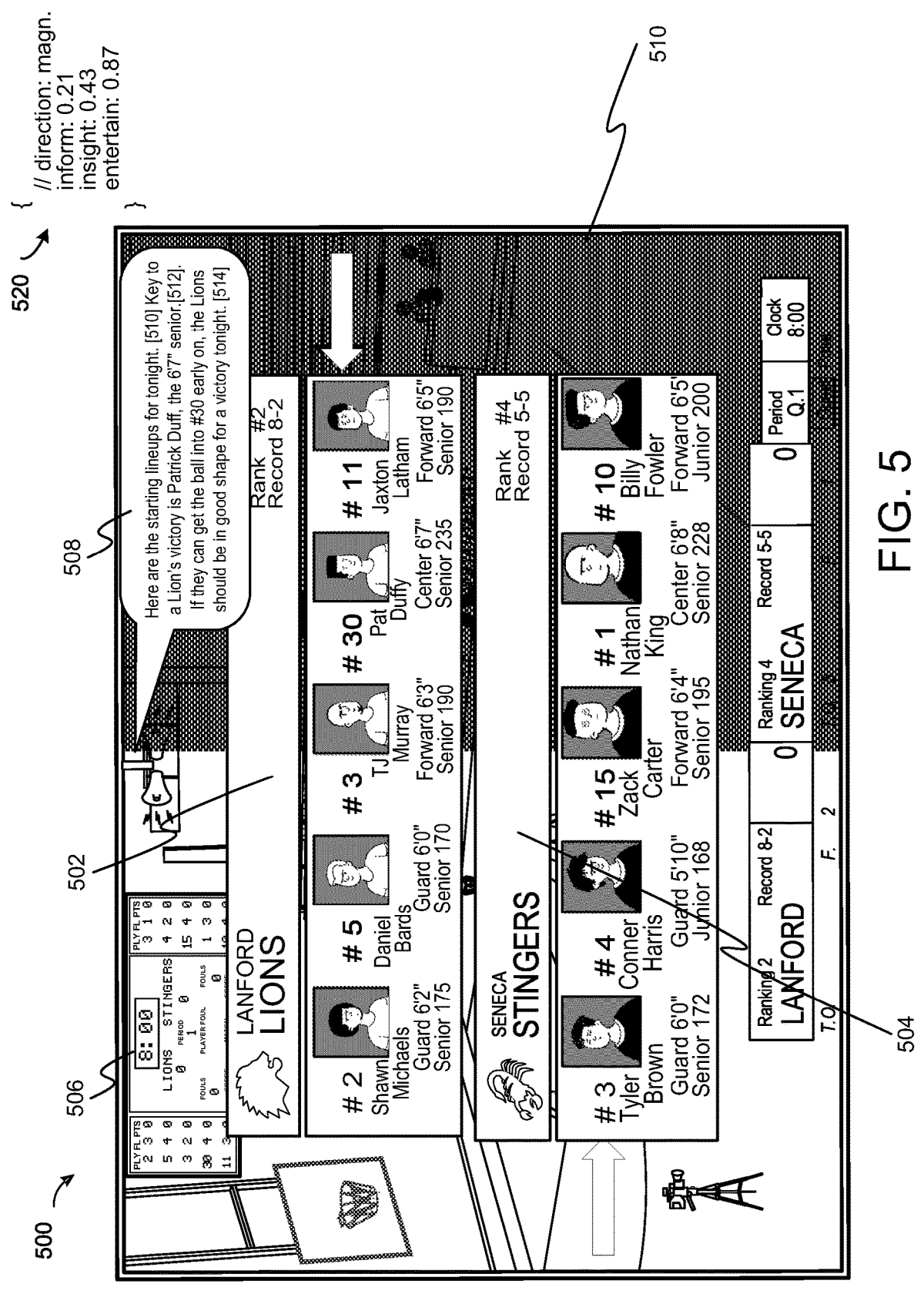

FIG. 5 is a schematic block diagram illustrating a pregame starting lineups media segment 500 featuring localized player level audiovisual content integrated with live-captured video and/or audio streams, according to one or more examples of the present disclosure.

As depicted on live video image of the onsite scoreboard 506, the game clock is not yet started indicating that the production route is between the start of the broadcast waypoint and the start of the game waypoint. Accordingly, the targeted sportscast velocity vector 520 has not been adjusted thus indicating that there is no waypoint that indicates a change in production route direction.

Each of the phrases depicted in the synthesized audio content 508 may have a score or magnitude for each of the velocity vector directions e.g., inform, insight, entertain that can be compared with the target sportscast velocity vector directions and magnitudes for the period between the indicated waypoints. Some phrases may incrementally adjust the magnitude of only one direction such as inform and other phrases may adjust the magnitude of another direction such as insight or entertain.

The synthesized segment selector 336 may be configured to select content that in the aggregate most closely matches the magnitude of all three directions even if the individual phrases have a score or magnitude that is primarily in only one direction such as inform or two directions such as for example insight and entertain.

The first phrase "here are the starting lineups for tonight" 510 that is largely in the inform direction. The second phrase "key to a Lion's victory is Patrick Duff, the 6'7"senior" 512 may be considered to have scores largely in the insight direction and the third phrase "if they can get the ball into number 30 early on, the Lions should be in good shape for victory tonight" may be considered to have scores in the insight direction and the entertain direction because part of entertainment is to promote content that entertains the audience by suggesting that their team will be victorious.

With regard to video content segments, the synthesized segment selector 336 may be configured to select some video content based on a current waypoint and/or a current game state. Other video content may be selected to enhance the production quality of video content segments selected based on game related content.

For example, in FIG. 5, a video overlay model depicted for presenting the home team starting lineup 502 and the away team starting lineup 504 is shown with a generally light background color. For video production purposes, content of this type may include an indication that a contrasting and partially transparent masking screen 510 should be generated to overlay the live video so that the graphics overlay for presenting the home team starting lineup 502 and the away team starting lineup 504 stands out more and at the same time some of the live video capturing warmup activity of the players remains at least partially visible.

Figure 6:
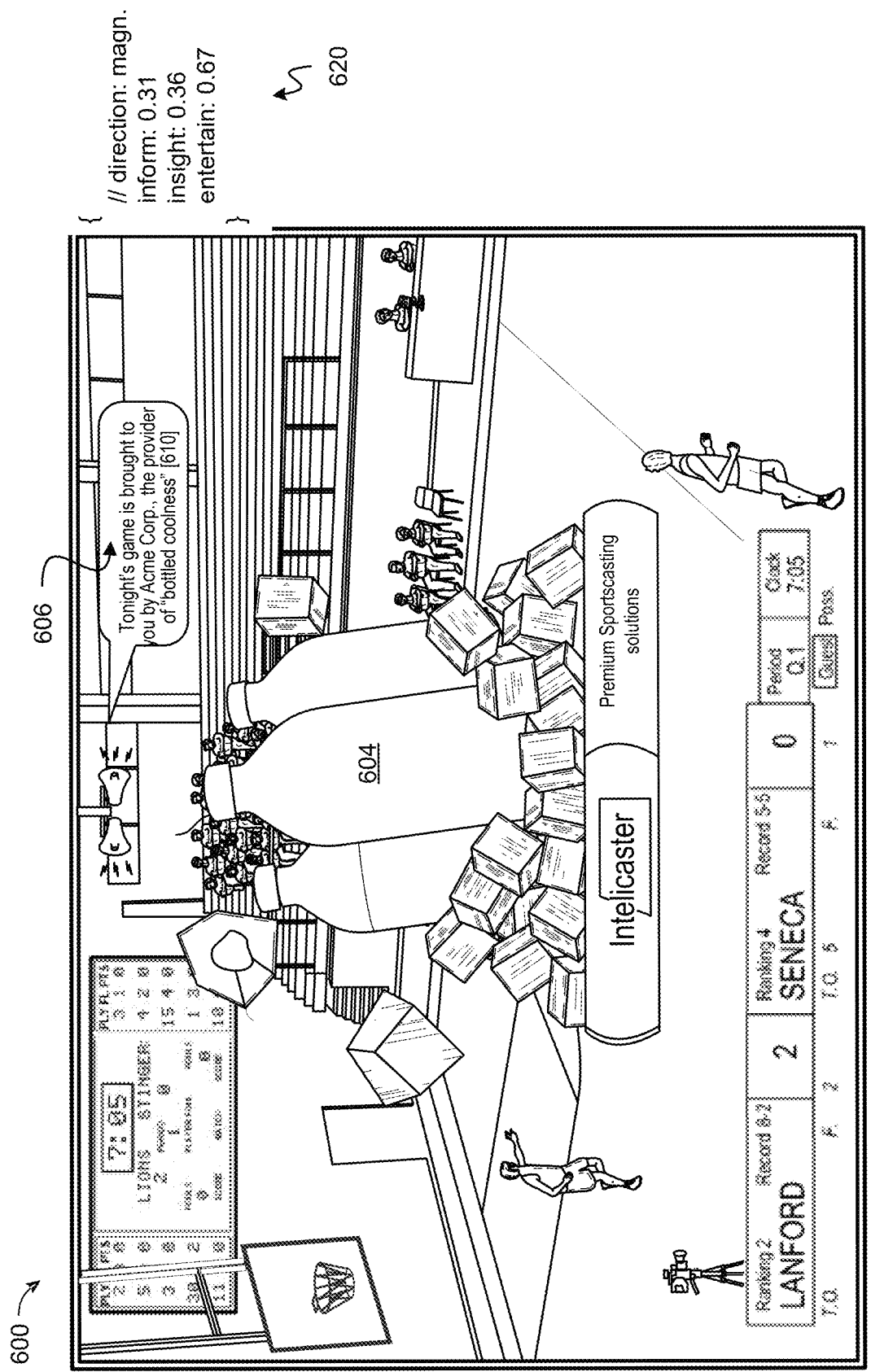
FIG. 6 is a schematic block diagram illustrating an in-game media segment featuring audiovisual content including precommitted commercial content integrated with live-captured video and/or audio streams, according to one or more examples of the present disclosure.

FIG. 6 is a schematic block diagram illustrating an in-game media segment 600 featuring video content 604 and audio content 606 including precommitted commercial content integrated with live-captured video and/or audio streams, according to one or more examples of the present disclosure. In some implementations, the audio content 606 may include, for example, a phrase 610 "Tonight's game is brought to you by Acme Corp., the provider of bottled coolness".

Although a determination about whether precommitted content 332 is prioritized over the types of content included in the target sportscast velocity vector 620 as directions is primarily based on precommitted content deadline instructions stored in the cache of precommitted content 332, in certain implementations, precommitted content 332 itself may be scored with regard to one or more of the inform, insight, and entertain vectors. For example, if precommitted content 332 is scored as having high entertainment value, and the current target velocity vectors.

Each of the content managers, e.g., inform content manager 318, insight content manager 320, entertain content manager 322, may have any number of audio and/or video content segments cashed configured to be presented as candidate content in response to validated live event observations 316. The precommitted content manager 324 may likewise have any number of audio and/or content segments cached based on the number of precommitted content slots specifically selected for the particular game or to be played at or between selected waypoints.

For example, a first waypoint identified in the production route model 252 may be the beginning of the broadcast and a second waypoint identified in the production route model 252 may be the official start of game action e.g., tipoff, kickoff, first at bat, etc. Accordingly, in between such a first waypoint and such a second waypoint might be referred to as a pregame period and the target sportscast velocity vectors 620 would generally be very similar if not identical to the initial sportscast velocity vectors 304 because no game action has taken place which would affect the score and thereby change the game state.

Furthermore, data within precommitted content 332 may indicate that the audio and or video segments associated with the precommitted content 332 is configured to be integrated into the media stream at a particular time or particular portion within certain time periods such as pre-game, timeout, end of quarter, halftime, two-minute warning, post-game, For example, in a 90-second timeout period for American football, a 15 second promotional segment for precommitted content 332 may indicate that the segment should be integrated into the media stream at around 30 seconds into the 90 second timeout. In a tennis match, a production route segment between waypoints suitable for integrating precommitted content into the media stream may be during a set break at the end of each set which has a maximum period of two minutes.

In various implementations, the synthesized segment selector 336, via the precommitted content manager 324, accords highest selection priority to precommitted content 332 which has an upcoming committed deadline. i.e., there is a contractual or other commitment to play the precommitted content 332 before the committed deadline. In such implementations, the segment selector 336 does not get the precommitted content directly from the precommitted content cache but it goes through the precommitted content manager 324. Similarly, some of the other types of content managers 317, such as the inform content manager 318, the insight content manager 320, and the entertain content manager 322 are configured to retrieve content from one or more of the content caching modules 310 suitable for the target sportscast velocity vectors 306 for a current waypoint. In some cases, one or more of the content managers 317 may retrieve content from any of the content caching modules 310 that has a suitable entertain direction score or magnitude for the target sportscast velocity vectors 306 for the current waypoint.

In certain implementations, even where a precommitted content segment has been scheduled to be integrated into the media stream, it may be interrupted and/or resumed when even higher priority type of event occurs. Such interruptions to media segments containing precommitted content are designed to be rare but theoretically could occur if a "breaking news" type event occurred such as a dramatic injury to a key player.

It may be noted that precommitted content segments may be prerecorded or synthesized on the fly. For promotional content, commercials or advertisements may already be very highly produced and the sponsoring entity may arrange to have the commercial inserted unmodified. On the other hand, promotional content may be cached in the form of a concept that in response to a theme or concept prompt providing the basic information such as name of the product or service being promoted, superlative qualities of the product or service being promoted, and or call to action the generates synthesized text and or graphics using artificial intelligence FIG. 7 is a schematic block diagram illustrating an in-game media segment 700 featuring audiovisual content including a combination of inform content and insight content integrated with live-captured video and/or audio streams, according to one or more examples of the present disclosure.

During the broadcast period related to a live sporting event, the production route model 252 may be configured to have waypoints defined based on the game clock, based on game state, based on elapsed time or remaining time within an allotted sportscast time window, or on other criteria such as may be predetermined based on training data or based on events which cause the adaptive routing module to modify the magnitudes corresponding to the inform, insight, and entertain directions for the target sportscast velocity vectors.

Figure 7:
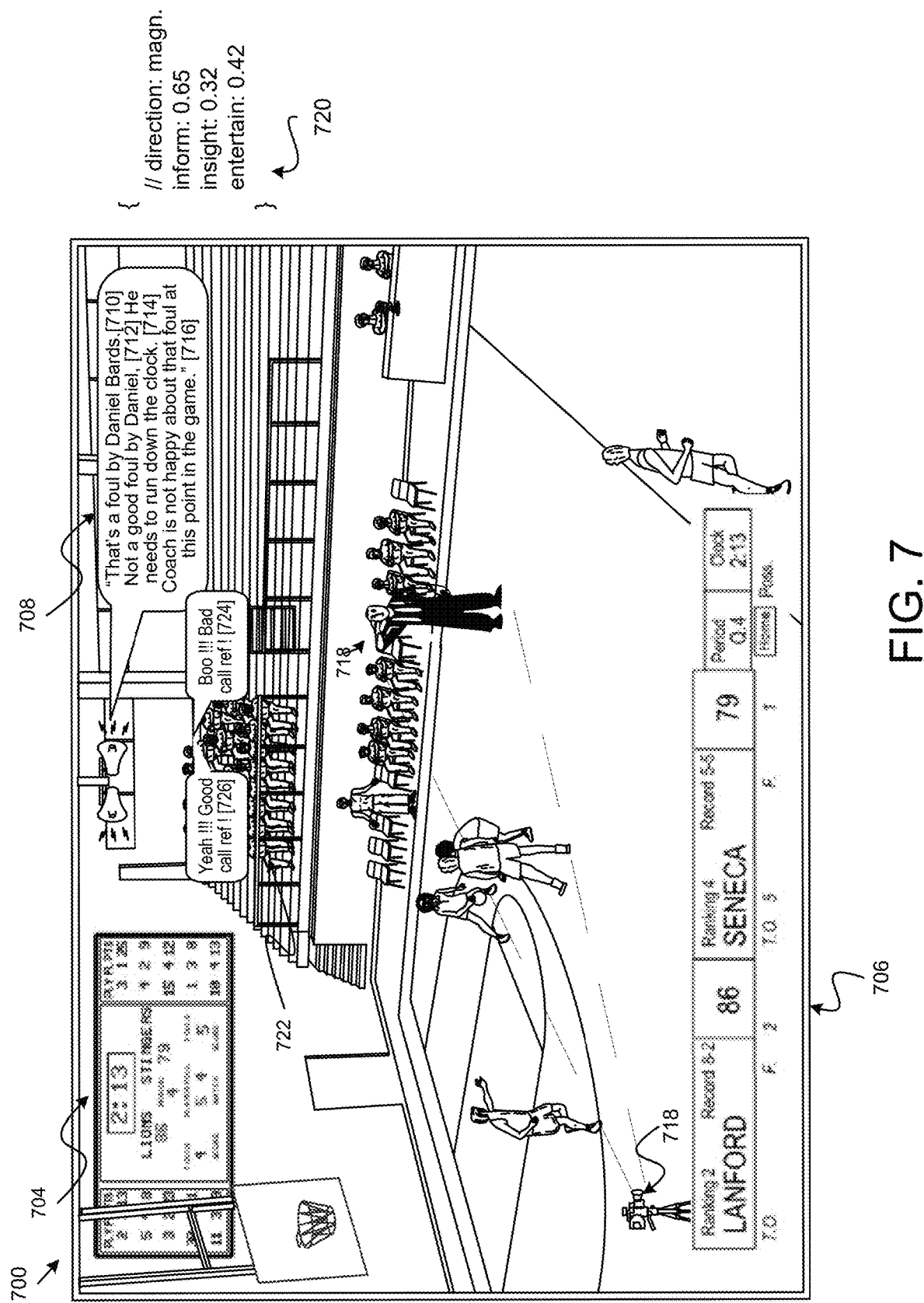
FIG. 7 is a schematic block diagram illustrating an in-game media segment featuring audiovisual content including a combination of information and insight content integrated with live-captured video and/or audio streams, according to one or more examples of the present disclosure.

In the context of the basketball game depicted in FIG. 7, the intelligent sportscast production engine 102 may determine from the onsite scoreboard data feed that the score is home team Lanford 86 away team Seneca 79. The intelligent sportscast production engine 102 may further determine that there are two minutes and 13 seconds remaining in the fourth quarter. In the depicted example, the production route model 252 determines target sportscast velocity vectors 306 for the current waypoint which is near the end of the fourth and final quarter of the game.

Accordingly, the target sportscast velocity vectors 306 for the current waypoint are adjusted such that the magnitude of the target inform content direction is significantly higher than it was at earlier waypoints in the game and the magnitudes of the insight content direction and entertain content direction are significantly lower based on the determination that the production quality of the sportscast media stream will be more appealing if candidate cues that capture life event observations related to scoring are prioritized over long form audio commentary and or graphical content such as insight content and entertain content.

Referring again to FIG. 3, in various example implementations, the synthesized segment 336 may select both synthesized audio segments and/or synthesized video segments. Both with synthesized audio segments and synthesized video segments, a first content manager to generate a first candidate cue 334 from a live event observation 316 may be the inform content manager 318 responding to a live event observation such as a player scoring. In various implementations, the insight content manager 320 will generate one or more follow-up second candidate cue 334 based on live stats info 326 or a priori info 328 in response to the first candidate cues 334 generated by the inform content manager.

For example, in FIG. 7, the depicted synthesized audio segment 708, the first phrase "that's a foul by Daniel Bard" 710 is an example candidate cue that may be directly determined from a live event observation based on the onsite scoreboard data feed. The second phrase "not a good valve by Daniel" 712 may be determined using a variety of inputs and predetermined or synthetically derived rules or models. For example, one relevant input may be the fact that the player committing the foul is a starting guard for the home team Lanford Lions who have a lead of only seven points with just over two minutes to go in the game. The analysis the foul was not a good foul may be based on predetermined or synthetically derived rules or artificial intelligence models based on training data that if a team is ahead late in the game but not by a lot, fouling the other team has a number of negative consequences such as stopping the game clock, giving the other team the chance to score with the clock stopped by making shots, moving closer to a bonus situation in which the other team gets progressively more advantageous foul shot conditions, etc.

These rules can be encoded or synthetically derived from the production route planner accessing theme content or AI prompts 330 where information about fouls may be stored.

Accordingly, when the insight content manager 320 receives the validated live event observation 316 that leads to the inform content manager generating a candidate cue stating "that's the foul by Daniel Bard," the insight content manager generates a candidate cue using one or more data items from the live stats info 326, the a priori info 328, and/or the theme content or prompts 330 to generate the insight content synthesized audio segment "not a good foul by Daniel" 712. The subsequent synthesized audio segment "he needs to run down the clock" 714 and "coaches not happy about that now at this point in the game." 716 may also be selected by the insight content manager 320 for inclusion in candidate cues 334 and selected by the synthesized segment selector 336 based on such candidate cues being the best available candidate cues for the current magnitude values of the target sportscast velocity vectors 720 for the respective directions for the current waypoint.

As a further example illustrated in FIG. 7, the production route planner 214 may produce validated live event observations by performing one or more of: (a) checking that the occurrence of the one or more live event observations is consistent with the occurrence of one or more prior validated live event observations, (b) verifying that the occurrence of the one or more live event observations is consistent with results of machine recognition of non-scoreboard data from the live video feed captured by an onsite camera and/or microphone, (c) checking the live event observations for compliance with a set of predetermined rules for a selected type of the live sporting event, and combinations thereof. In the case of a live event observation 212 that includes a foul such as described by synthesized audio segment 710, the production route planner 214 may produce a validated live event observation or even a live event observation with additional relevant data by verifying that the occurrence of the foul is consistent with results of machine recognition of non-scoreboard data such as by machine recognition of a hand behind the neck signaled by the referee from the live video feed captured by an on-site camera.

Although the insight content manager 320 may make an initial determination that the foul Daniel Bard was an offensive foul from the on-site scoreboard data feed, for example by knowing that Daniel Bard's team had possession of the ball as of the last live event observation and that therefore if Daniel Bard committed the foul it must have been an offensive foul, non-scoreboard data such as the control foul/offensive foul signaled by the referee to validate the live event observation and or to provide additional data that may be used to tailor the insight content more precisely to the particular live event that occurred, namely an offensive foul that provides further evidence that the foul was not a good one because it resulted in possession of the ball being turned over to the other team.

Other examples of aspects of the production route planner 214 are illustrated in FIG. 7. For example, as described earlier, a first instantiation of the intelligent sportscast production engine 102 may be configured provide a sportscast media stream for the home team for a particular sporting event and a second instantiation of the intelligent sportscast production engine 102 may be configured to provide a different sportscast media stream for the away team.

Certain aspects of entertain content involve capturing or portraying on-site fan engagement in a way that resonates with the target audience. However, in some venues, it is difficult to capture live crowd response because of lack of high-quality microphones near the crowds. Furthermore, it may be desirable to simulate a live crowd response that is more aligned with the intended audience, e.g., a simulated online crowd response, which aligns with the home team audience for the first instantiation and a simulated online crowd response that aligns with the away team audience for the second instantiation. Accordingly, crowd noise and/or shouts may be generated to provide entertain content directed to a particular audience. More specifically, the synthesized audio segment "boo!!! bad call ref" 724 may be synthetically generated by the first instantiation of the intelligent sportscast production engine 102 as entertain content for a home team audience so that the emotional response of the home team fans may be portrayed in an entertaining but also clearly audible way. On the other hand, the synthesized audio segment "Yeah, good call ref" may be synthetically generated by the second instantiation of the intelligent sportscast production engine 102 as entertain content.

At the current waypoint depicted in FIG. 7, the magnitude 0.42 of the entertain direction of the target sportscast velocity vectors 720 is relatively high. Although the inform content direction has an even higher magnitude 0.65 immediately following a foul there will naturally be fewer scoring driven live event observations that need to be captured as candidate cues for inform content because the game clock may stop when a foul is made especially if foul shots are taken. Therefore, to avoid "dead air," several consecutive synthesized audio segments other than inform content such as insight content and entertain content may be selected by the synthesized segment selector 336.

In various implementations, the production route planner 214 may produce validated live event observations by performing one or more of: (a) checking that the occurrence of the one or more live event observations is consistent with the occurrence of one or more prior validated live event observations, (b) verifying that the occurrence of the one or more live event observations is consistent with results of machine recognition of non-scoreboard data from the one or more live video feeds captured by an onsite camera 718 and/or microphone, (c) checking the live event observations for compliance with a set of predetermined rules for a selected type of the live sporting event, and combinations thereof. In the case of a live event observation 212 that includes a foul, such as described by synthesized audio segment 710, the production route planner 214 may produce a validated live event observation by verifying that the occurrence of the foul is consistent with results of machine recognition of non-scoreboard data such as an upraised from the live video feed captured by an on-site camera 718.

Figure 8:
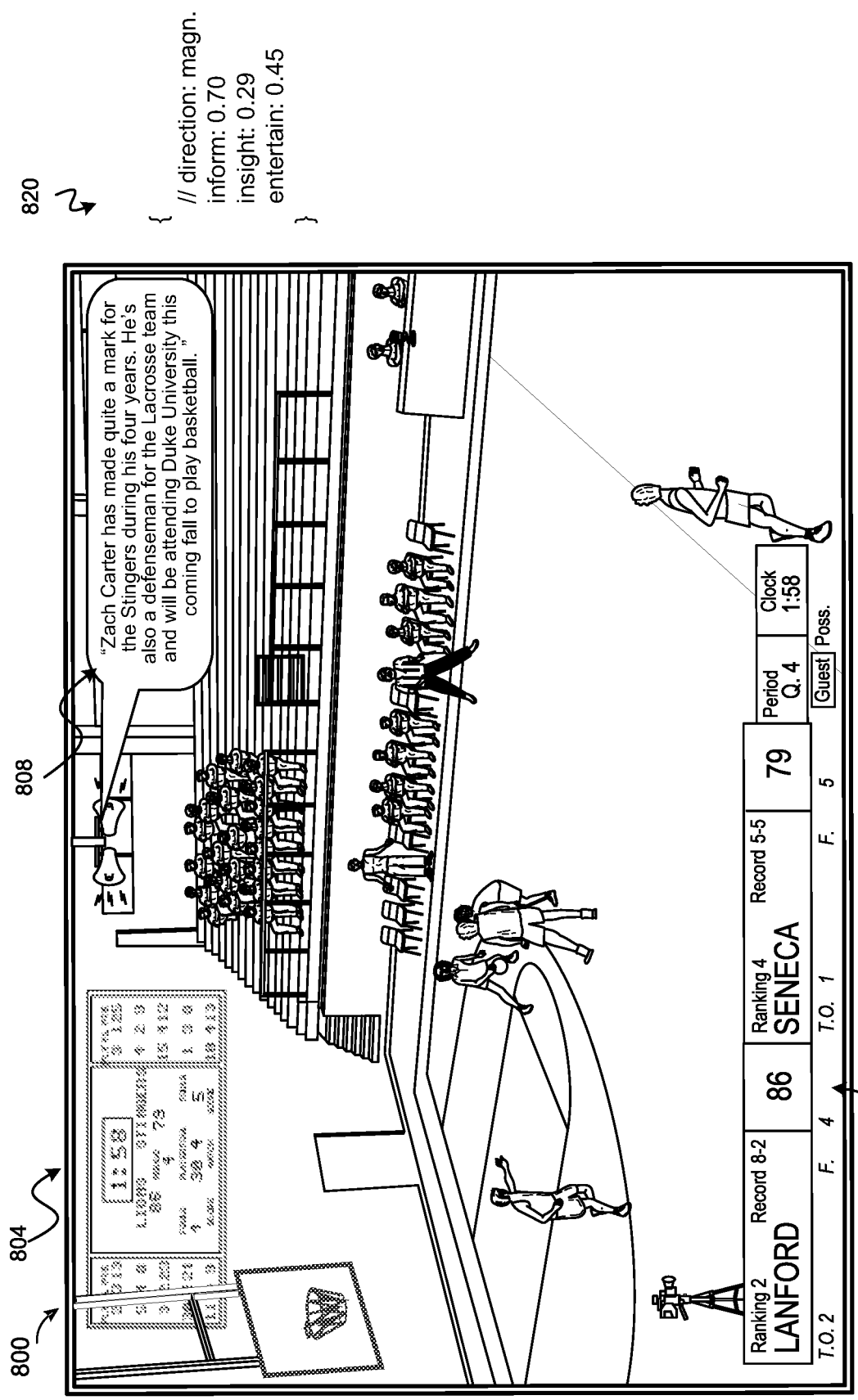
FIG. 8 is a schematic block diagram illustrating an in-game media segment featuring audiovisual content including player-focused insights integrated with live-captured video and/or audio streams, according to one or more examples of the present disclosure.

FIG. 8 is a schematic block diagram illustrating an in-game media segment 800 featuring audiovisual content including synthesized audio segments with player-focused insight content, according to one or more examples of the present disclosure.

As can be seen in the live video image of the on-site scoreboard 804 or the scoreboard overlay 806 generated using scoreboard-derived input data 208 (depicted in FIG. 2) only about 15 seconds of the game clock have ticked down since the period of time depicted in FIG. 7. Notably, although the target sportscast velocity vector 820 was already configured to reflect a high magnitude of content to be informed content based on the fact that this is the final quarter of a relatively close game, the target sportscast velocity vectors 306 were configured to include a new waypoint at the point in time at which two minutes remain on the game clock. As the new waypoint was passed, the score did not change but the magnitude of the inform content direction increased slightly from 0.65 to 0.70 and the magnitude of the insight content direction decreased slightly from 0.32 to 0.29 while the entertain content direction magnitude increase slightly from 0.42 to 0.45 to reflect a production route model 252 in which, near the end of a close game, the inform content direction will increase in order to report any change in the score or other critical game status data and the entertain content direction will increase in order to increase the likelihood of the synthesized segment selector 336 selecting content that is informative but also entertaining so that synthesized phrases or graphic overlays surrounding informative content will also promote excitement in the conclusion of the game through the selected or synthesized audio segments and/or video segments.

However, FIG. 8 may also be used to further illustrate the principle that even though the magnitudes of the inform content and the entertain content are relatively higher that the magnitude of the insight content, the synthesized segment selector 336 insight content when the availability of applicable inform content and or entertain content is low. Accordingly, the synthesized audio segment 808 providing information about Seneca player Zach Carter may derived from a priori info 328 which includes information about Zach Carter's success on the team, his non-basketball activities, and is plans for continuing his academic career as a basketball player.

The fact that the synthesized audio content 808 does not include much inform content may be based on the fact that the selected candidate cues were the best available (e.g., least absolute value difference of content direction ratings vs target velocity vector) to move towards the target sportscast velocity vector for the new current waypoint.

Figure 9:
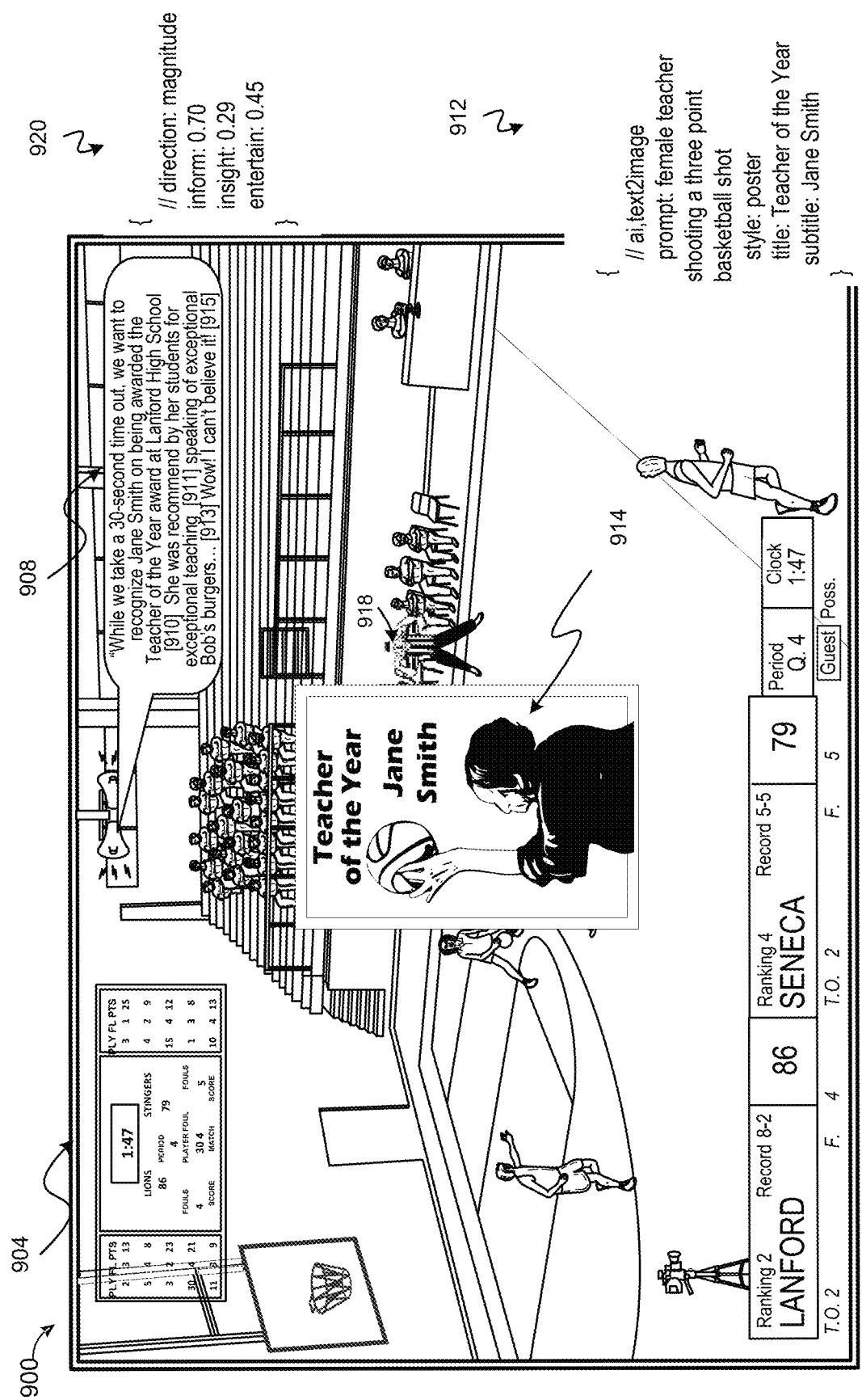
FIG. 9 is a schematic block diagram illustrating an in-game media segment featuring audiovisual content including targeted community commercial content integrated with live-captured video and/or audio streams, according to one or more examples of the present disclosure.

FIG. 9 is a schematic block diagram illustrating an in-game media segment 900 featuring audiovisual content that includes community interest content integrated with live-captured video and/or audio streams, according to one or more examples of the present disclosure.

In the example depicted in FIG. 9, although it is late in the fourth quarter, there are still community interest content segments which are configured to be selected by the synthesized segment selector 336 for inclusion as a production cue 216. In some examples, the community interest content segments include one or more synthesized audio segments 908 such as phrases 910 and 911 and one or more synthesized video segments such as synthesized graphic overlay 914.

In some implementations, community interest content segments may be implemented as precommitted content 332. While much of the precommitted content 332 may be promotional material such as advertisements, commercials, or the like, other content such as community interest announcements may be designated as precommitted content 332 prior to the game and may therefore have higher priority selection as production cues. In certain implementations, community interest content segments may be implemented as thematic content/prompts 330 with a high entertain direction magnitude. In various examples, both precommitted content 332 and thematic content/prompts 330 with a high entertain direction magnitude may be used for longer form comments to keep the streaming audience engaged during periods of scoring or other game action which tends to have higher inform content magnitude.

In either approach, the precommitted content 332 or the thematic content/prompts 330 may include an expected duration of one or more content segments. In some implementations, the expected duration is predetermined and stored with the precommitted content data. In certain implementations, such as for example when selecting thematic content/prompts 330 that are generated by artificial intelligence in response to a prompt, the expected duration may be a parameter which is passed to the artificial intelligence engine as a synthesized content duration limit or guideline. If the duration indicates longer form content e.g., greater than five seconds, greater than 10 seconds, greater than 15 seconds and so forth, the production route planner 214 will attempt to schedule such precommitted content during periods of fewer live event observations derived from changes in score during a close game.

In certain circumstances, some precommitted content 332 may still be a candidate cue 334 waiting to be selected as a production cue 216. Similarly, certain thematic content/prompts 330 may be suitable to be included at or between certain waypoints in the production route model 252 due to pauses, stoppages, or similar decreases in scoring or game action from which live event observations are derived. For example, during timeouts which may occur near the end of close games, the synthesized segment selector may prioritize selection of precommitted content 332 or thematic contents prompts 330 with high entertain magnitude.

As depicted in FIG. 9, a first phrase forming audio segment 910 tells the sportscast audience "while we take a 30-second timeout, we want to recognize Jane Smith on being awarded the teacher of the year award at Lanford high school" is synthesized in response to a life event observation derived from this scoreboard derived input data 206 or alternatively from recognized input data 208 in response to recognition by the recognition module 230 of a 30-second timeout being signaled by the official 918 taking both hands and placing them on top of his shoulders with his elbows out.

In the absence of suitably available precommitted contents 332, the synthesized segment selector 336 will continue to select content derived from live event observations which most closely aligns with the target sportscast velocity vectors 920 for the current waypoint.

In some examples, the synthesized video segments include prerecorded images and/or video clips. In one or more examples, a text prompt corresponding to the intended synthesized graphic content is conveyed to real-time image search engine which selects a suitable graphic based on matching between the prompt and index words in the search engine corresponding to available images. In certain examples, a text-to-image prompt 912 is generated corresponding to the desired synthesized graphic content 914 is conveyed to a real-time artificial intelligence graphics generator that generates graphics based on the text-to-image prompt.

The synthesized audio content 908 indicates two additional phrases being included. The phrase, "speaking of exceptional, Bob's burgers . . . " 913 which appears to be promotional content which may be precommitted content 332. However, phrase 913 also appears to have been interrupted. As depicted in FIG. 3 and an interrupt detector 314 may generate an interrupt in response to an exceptionally live event observation. Certain thematic content prompts 330 may be used to indicate exclamations of surprise, joy, irritation, and so forth. In the depicted example the phrase 915 "Wow! I can't believe it!" may be generated in response to the live event observation that a full-court pass unexpectedly scored a three-point basket.

As depicted in FIG. 3, when precommitted content 332 or content generated from live event observations 212 is already scheduled, the observation filter 312 may determine to stop or temporarily hold off processing and forwarding one or more live event observations by editing them e.g., saving, editing, deleting, or reordering until sufficient time elapsed to allow the scheduled content to be composed for streaming. In such circumstances, the interrupt detector 314 may determine that an interrupt signal needs to be sent to the content managers 318, 320, 322, and 324 and to the embed scheduler 338 in response to a live event observation that would otherwise have been filtered but which should instead be rerouted and integrated into the stream as a higher priority. The embed scheduler 338 may generate, edit, divide, or otherwise derive, smaller content segments to be pre-embedded or post embedded to facilitate transitions between content that was interrupted and content that is resumed as a follow-up to content that was interrupted.

Figure 10:
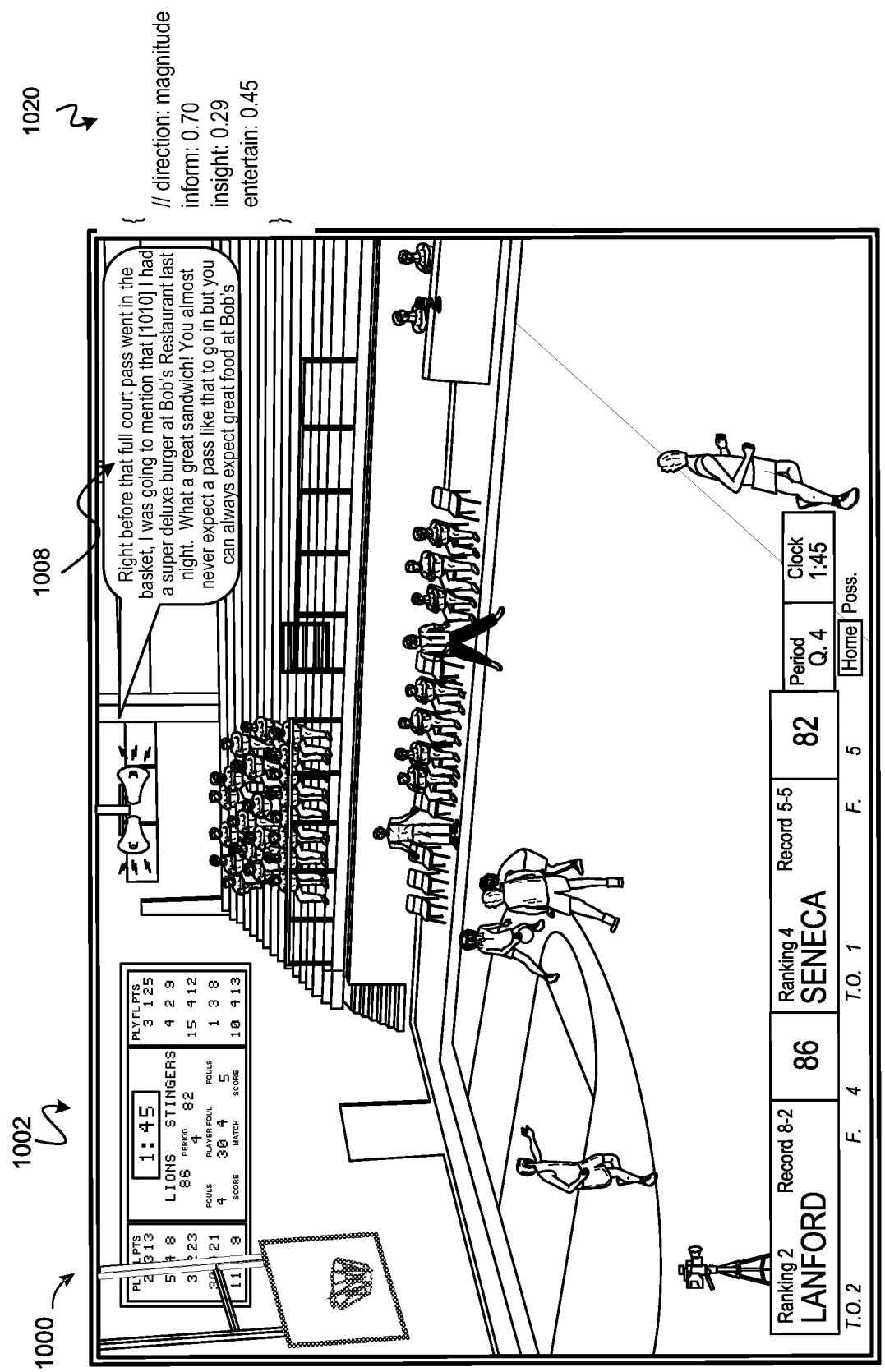
FIG. 10 is a schematic block diagram illustrating an in-game media segment featuring audiovisual content including targeted community public interest content integrated with live-captured video and/or audio streams, according to one or more examples of the present disclosure.

FIG. 10 is a schematic block diagram illustrating an in-game media segment 1000 featuring audiovisual content including targeted community public interest content integrated with live-captured video and/or audio streams. FIG. 10 depicts a target velocity vector 1020 with the following direction: magnitude elements: inform: 0.70, insight: 0.29, entertain: 0.45. In FIG. 10, the live video image 1002 of the onsite scoreboard and the graphic overlay 1006 generated using onsite scoreboard data, indicate that only two seconds have elapsed off the game clock since coming out of the 30-second timeout mentioned in the audio segment 910 depicted in FIG. 9. Yet, the scores indicate that the Seneca Stingers scored three points to move from 79 points to 82 points. Recognition of live video may be used to determine that as one of the Seneca players was inbounding the ball by making a full-court pass, the ball unexpectedly swished through the basketball net, scoring a very long three pointer.

The synthesized audio content 1008 includes a pre-embed synthesized audio segment 1010, e.g., "right before that full-court pass when in the basket, I was going to mention that" followed by precommitted content regarding an advertisement configured to be synthesized as an announcer made recommendation to eat at Bob's restaurant. To further facilitate transition between types of content, the embed scheduler may generate a post embed content such as the synthesized audio segment stating you almost never expect a pass like that to go in but you can always expect great food at Bob's."

Figure 11:
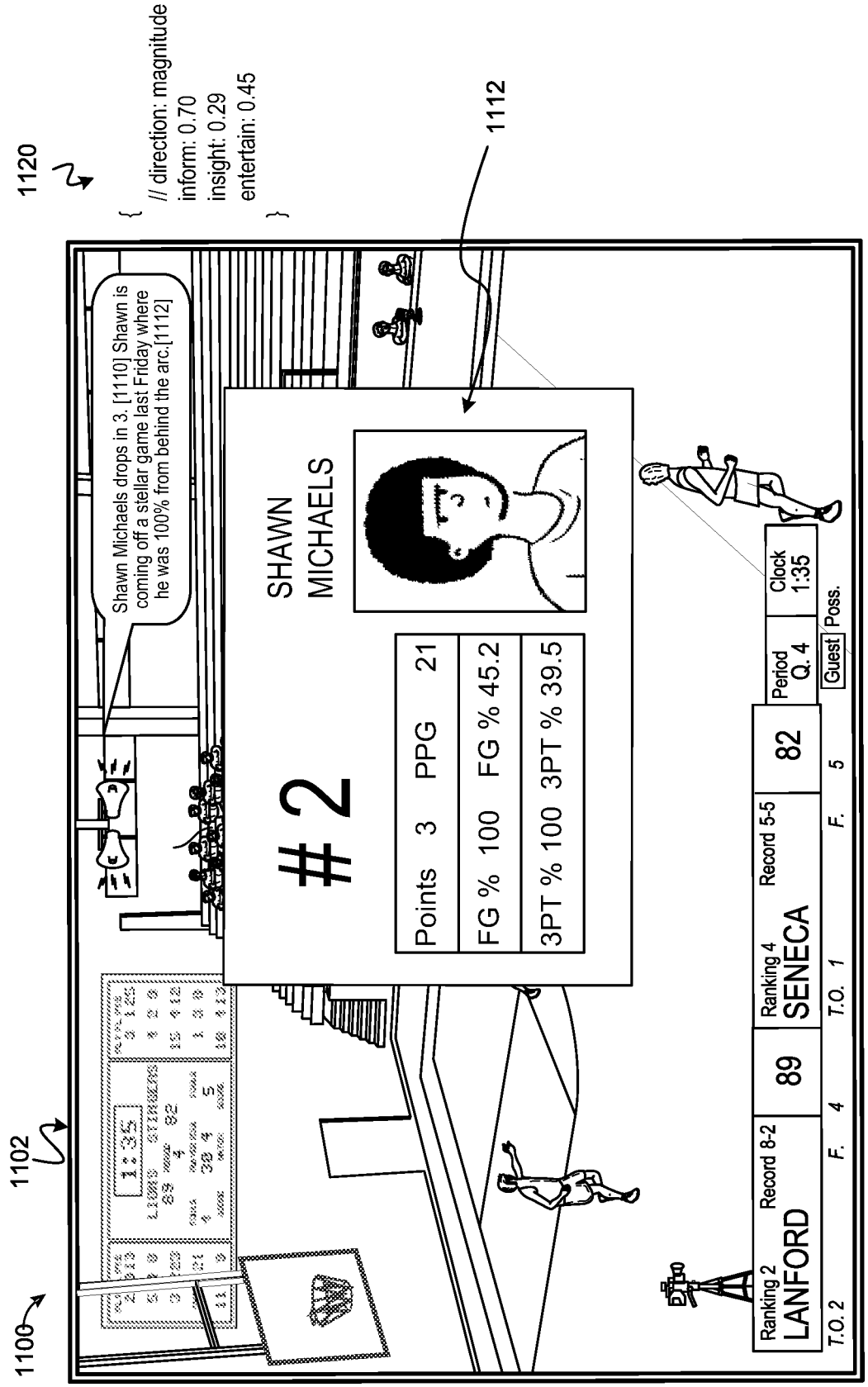
FIG. 11 is a schematic block diagram illustrating an in-game media segment featuring audiovisual content including a combination of information and insight content integrated with live-captured video and/or audio streams, according to one or more examples of the present disclosure.

FIG. 11 is a schematic block diagram illustrating an in-game media segment 1100 featuring audiovisual content including a combination of information and insight content integrated with live-captured video and/or audio streams. At this point in the game, as can be seen on the live video of the on-site scoreboard 1102 or on the synthesized graphical overlay scoreboard 1106, the Lanford Lions' senior guard Shawn Michaels just scored a three pointer to put Lanford ahead 89 to Seneca's 82 which generated a synthesized audio content with high inform magnitude as depicted in target velocity vector 1120 and was followed up by a synthesized audio segment 1122 with a reasonably good insight score e.g., talking about the game last Friday where he was 100% from behind the arc. In parallel with or in response to the inform content about the three-point shot by Michael, a synthesized graphical overlay segment 1112 is generated to visually depict similar information and insight as generated in the synthesized audio segments 1110, and 1112.

Figure 12:
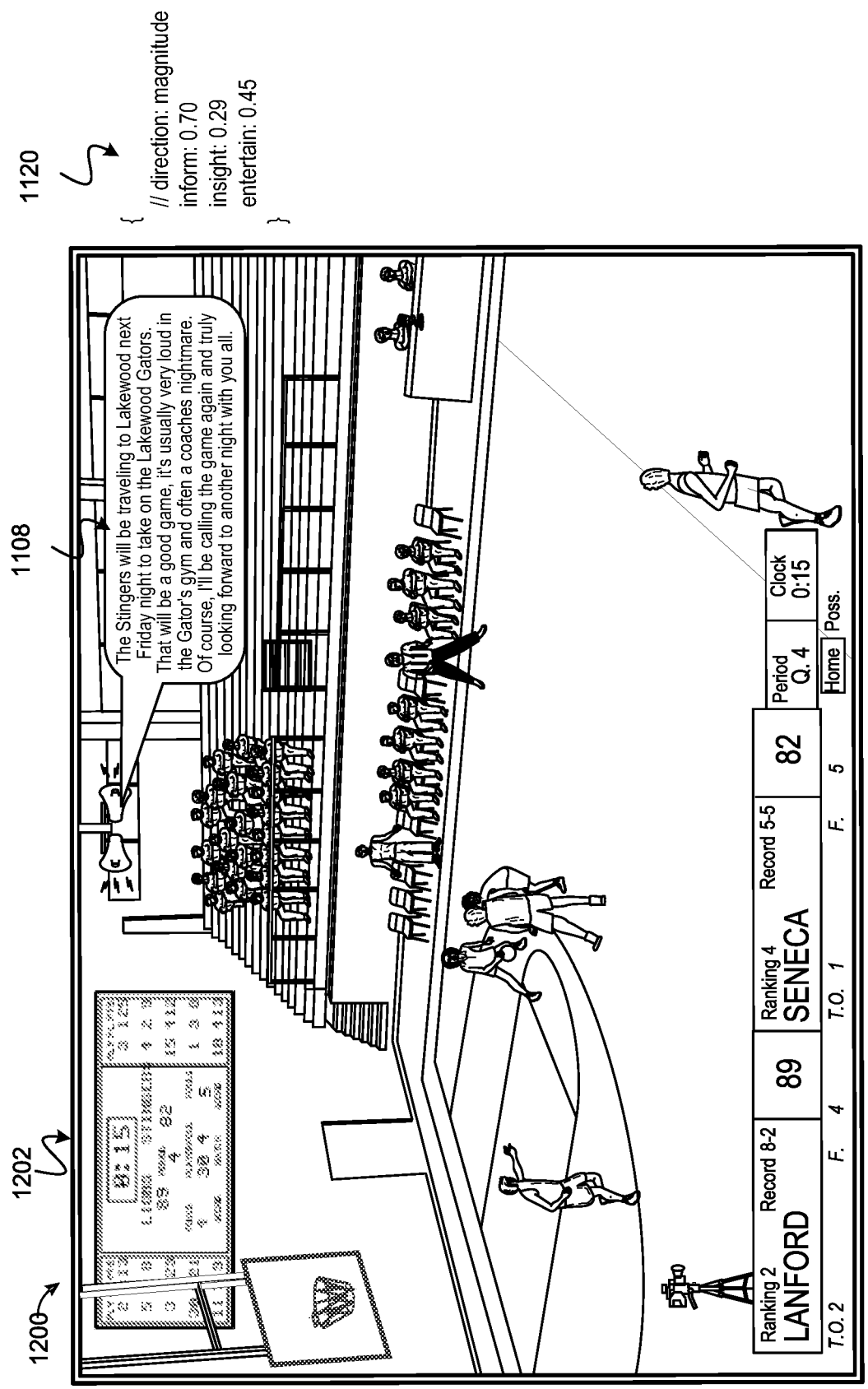
FIG. 12 is a schematic block diagram illustrating a media segment featuring audiovisual content including future event content integrated with live-captured video and/or audio streams, according to one or more examples of the present disclosure.

FIG. 12 is a schematic block diagram illustrating a media segment 1200 featuring audiovisual content including future event content integrated with live-captured video and/or audio streams. At this point in the game, as can be seen on the live video of the on-site scoreboard 1202 or on the synthesized graphical overlay scoreboard 1206, there are only 15 seconds left and it appears that the home team Lanford Lions will win the game since it would be very difficult to score 7 points in 15 seconds. Therefore, even though the magnitude of the inform direction in the target sportscast velocity vector 1120 is relatively high, Lanford has possession and it looks like they're just going to dribble out the remaining few seconds.

In the instantiations of the intelligent sportscast production engine 102 intended to be streamed to fans of the away team Seneca Stingers, the logic in the content managers may be configured, in response to a high likelihood of losing the game with very little time left on the clock, to select content such as depicted at reference 1108 that is intended to encourage the audience to look forward to the next game.

Figure 13:
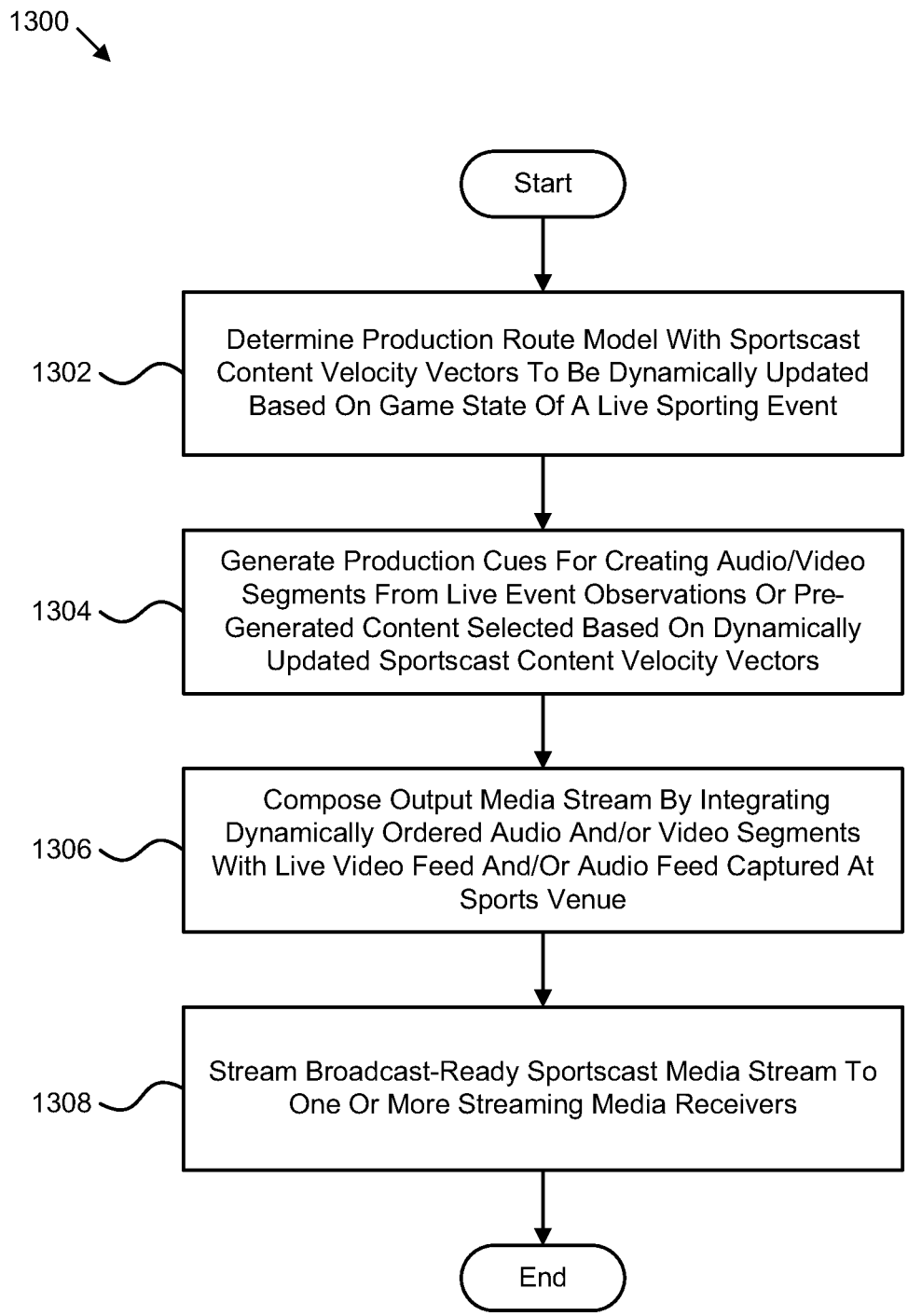
FIG. 13 is a schematic flow chart diagram illustrating a method for intelligent sportscast production for enhanced streaming of a live sporting event, according to various examples and/or implementations.

FIG. 13 is a schematic flow chart diagram illustrating a method 1300 for intelligent sportscast production for enhanced streaming of a live sporting event, according to various examples and/or implementations.

In various examples, the method 1300 begins and includes determining 1302 a production route model with initial sportscast velocity vectors configured to be converted to target sportscast velocity vectors based on game state of a live sporting event.

The method 1300 continues and includes generating 1304 production cues for producing sportscast content selected from dynamically ordered audio segments and/or video segments that are synthesized using live event observations and/or precommitted content, wherein the sportscast content is selected based on the target sportscast velocity vectors. The method 1300 continues and includes composing 1306 a sportscast media stream that comprises the dynamically ordered audio segments and/or video segments that are produced from the production cues integrated with a live video feed and/or a live audio feed captured at the live sporting event. The method 1300 continues and includes streaming 1308 the sportscast media stream to one or more streaming media receivers.

Figure 14:
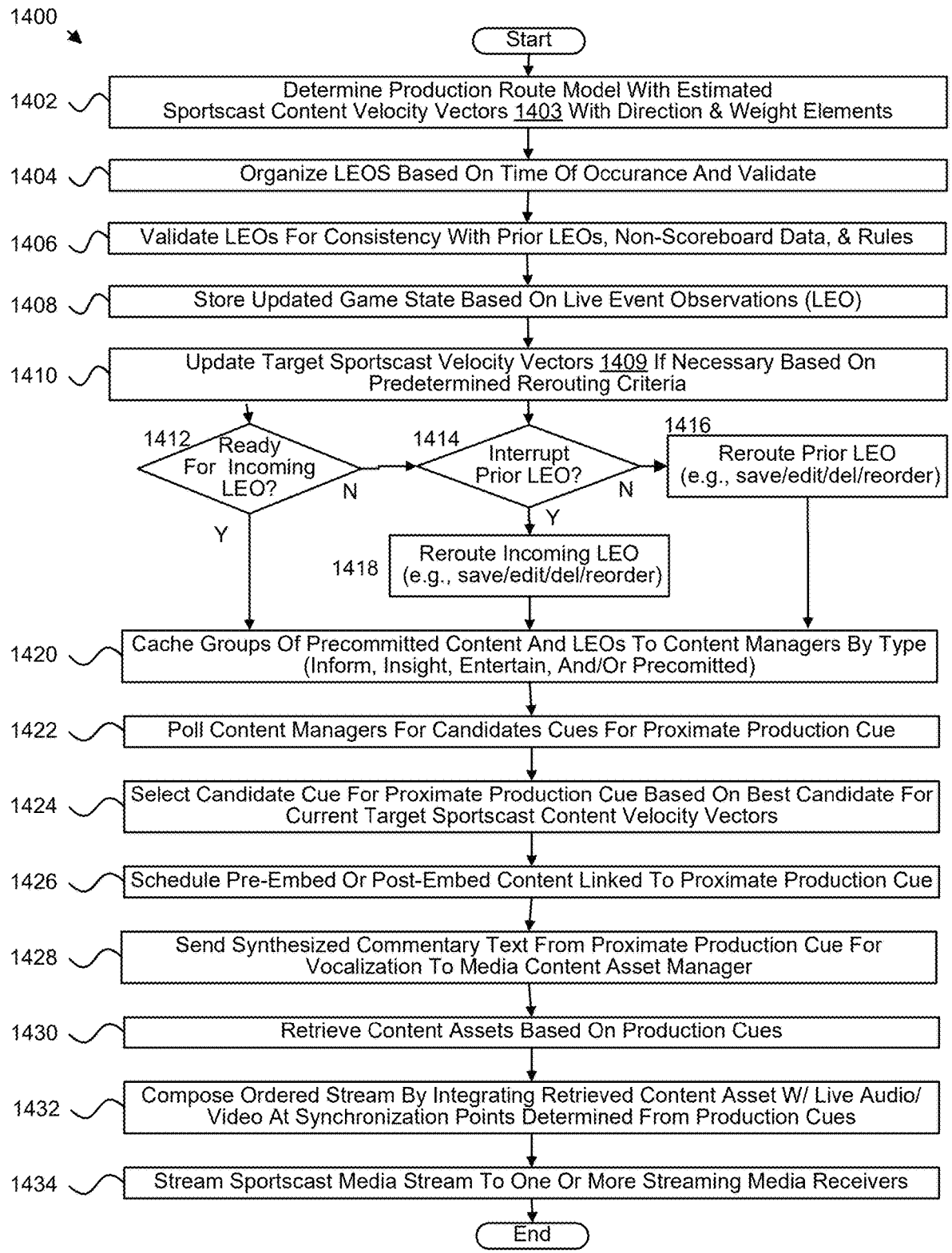
FIG. 14 is a schematic flow chart diagram illustrating a further method for intelligent sportscast production for enhanced streaming of a live sporting event, according to various examples and/or implementations.

FIG. 14 is a schematic flow chart diagram illustrating a further method 1400 for intelligent sportscast production for enhanced streaming of a live sporting event, according to various examples and/or implementations. In various examples, the method 1400 begins and includes determining 1402 a production route model with initial sportscast velocity vectors configured to be converted to target sportscast velocity vectors based on game state of a live sporting event.

In various examples, at least a first portion of the live event observations are derived from a live scoreboard data feed associated with an onsite scoreboard and/or machine recognition of scoreboard data from a live video feed captured by an onsite camera.

In certain examples, at least a second portion of the live event observations are derived from a combination of a live scoreboard data feed associated with an onsite scoreboard and machine recognition of non-scoreboard data from a live video feed captured by an onsite camera and/or microphone.

In some examples, the method 1400 continues and includes organizing 1404 one or more live event observations based on time of occurrence.

In various examples, the method 1400 continues and includes producing 1406 validated live event observations by performing one or more of: checking that the occurrence of the one or more live event observations is consistent with the occurrence of one or more prior validated live event observations, verifying that the occurrence of the one or more live event observations is consistent with results of machine recognition of non-scoreboard data from a live video feed captured by an onsite camera and/or microphone, checking the live event observations for compliance with a set of predetermined rules for the sporting event, and combinations thereof.

In one or more examples, the initial sportscast velocity vectors 1403 and the target sportscast velocity vectors 1409 individually include one or more sportscast direction elements that indicate an extent to which the sportscast content is configured to be directed to inform content, insight content, entertain content, and combinations thereof. In the depicted examples, precommitted content 332 may be configured to supersede 1410 the selection of inform content insight content and entertain content of the target sportscast velocity vectors 306 unless certain predetermined criteria indicating an exception to the selection of precommitted content are met. As with other types of content, precommitted content may be interrupted in a manner similar to that depicted at step 1414 by certain live event observations of such great importance that the candidate cue which would have otherwise been generated is discarded, postponed, detoured, or so forth. In other words, when the game state changes to such an extent that proceeding with the production route model 252 with the initial sportscast velocity vectors 304 would be suboptimal, the adaptive routing module 302 modifies the target sportscast velocity vectors 306 to reflect the rerouted production plan.

The sportscast velocity vectors 1403, 1409 also include magnitude elements that indicate a relative selection priority for content corresponding respectively to the one or more sportscast direction elements.

In some examples the method 1400 includes determining 1412 a readiness for an incoming live event observation. For example, if during ongoing processing of a prior live event observation with a relatively long duration, e.g., a 30-second precommitted content segment or a 15-second synthesized audio segment with insight content about a particular player or team historical record, another live event observation of high priority is incoming, the method 1400 may determine a lack of readiness for the incoming live event observation.

Accordingly, the method 1400 may then determine whether to interrupt 1414 the prior live event observation or to edit 1416 the prior live event observation. In certain examples, the method 1400 includes modifying 1418 timing related parameters of selected live event observations for generating the production cues by performing on the selected live event observations one or more editing operations selected from splitting, combining, truncating, deleting, lengthening, shortening, reordering, postponing, resuming, replacing, and/or combinations thereof.

For example, if at ten seconds into an insightful twenty-second synthesized audio content segment on the history of the rivalry between the teams, a star player makes a critical shot block in basketball or intercepts a pass in American football, the method may determine that a corresponding live event observation should interrupt the prior live event observation with the live event observation about the blocked shot or the interception.

Accordingly, the method may further determine to edit the prior live event observation by splitting off the remaining ten-second portion of the synthesized audio content segment about the rivalry and postponing it until after the incoming content that led to the interruption has been processed. Various combinations of the aforementioned editing operations may be utilized in accordance with predetermined or dynamically updated criteria.

In certain examples, the method 1400 may include editing the production cues in an order that is different from a temporally linear order indicated by timestamps of corresponding live event observations. For example, a particular live event observation such as an item of insight content based on a change in score may be saved for follow up to generate a production cue after a later-occurring live event observation which was selected for use in an earlier production cue rather than ordering all production cues according to the timestamps of corresponding live event observations.

In various examples, the method 1400 continues and includes caching 1420 the groups of candidate content according to one or more direction elements of target sportscast velocity vectors, wherein the target sportscast velocity vectors are selected from inform content, insight content, entertain content, precommitted content, and combinations thereof. In other words, the various items of content in the content caching modules may include direction and magnitude scores that can be compared individually or collectively with the target sportscast velocity vectors 306 for the current waypoint.

For example, a live event observation derived from a live scoreboard data feed associated with an onsite scoreboard may indicate that a guard for the home basketball team just scored a 3-point basket. Such a live event observation may be cached in parallel to multiple content manager 317, such as, for example, the inform content manager 318, the insight content manager 320, the entertain content manager 322, and the precommitted content manager 324 that are depicted in FIG. 3. Each of the content managers 317 processes the live event observation to derive candidate content for potential selection as a best-fit proximate production cue to be included in the production cues 216 output by the production route planner 214.

In some examples, the method 1400 continues and further includes polling 1422, the cached groups of candidate content to select content for a best-fit proximate production cue based on the target sportscast velocity vectors.

In various examples, the method 1400 then selects 1424 the candidate cue 334 which is derived from one or more validated live event observations or an item of precommitted content which most closely matches the target sportscast velocity vectors 306 for the current waypoint in the production route model 252.

In certain examples, the method 1400 includes scheduling 1426 pre-embed or post embed content to be linked to a proximate production cue. Content may define pre-embedded and post embedded content. Embedding allows larger content to be broken into smaller, decomposable pieces. Where a production cue for generating audio segment content includes commentary text for vocalization, a scheduling process for embedding portions of content to be integrated before or after a selected item of content depending on whether the embedded content is designated for pre-embedding or post-embedding.

In some examples, the method 1400 continues and includes sending 1428 synthesized commentary text within production cues designated for vocalization to be vocalized for inclusion in at least a portion of the dynamically ordered audio segments. In certain implementations, the dynamically ordered audio segments comprising vocalized text are stored 1408 via external content services to be retrieved for integration when the sportscast media stream is composed.

When such a live event observation is cached to one place for processing as inform content, the processing may create a candidate production cue to generate audio content text for vocalization that informs that the three-point shot was made. The processing may also include in the production cue instructions for changing an online graphic overlay to show that the three-point shot was made which also be considered inform content.

In various examples, the method 1400 continues and includes retrieving 1430 content assets 250 based on one or more production cues.

In certain examples, the method 1400 continues and includes composing 1432 the sportscast media stream by integrating the dynamically ordered audio segments and/or video segments that are produced from the production cues with live video feed and/or the live audio feed at synchronization points determined based on the target sportscast velocity vectors.

In some examples, the method 1400 continues and further include streaming 1434 during the live sporting event, at least a portion of the sportscast media stream to one or more audio devices and/or video devices at the live sporting event.

For example, in some implementations, the latency of live events to production sportscast media stream output may be counted in number of seconds. Accordingly, the sportscast media stream produced may be used for providing informative, insightful, and entertaining segments to the audience at the live sporting event venue through very large screen on-site video displays and/or on-site sound systems. In other implementations, the sportscast media stream produced may be broadcast via Wi-Fi to audience members using personal devices to get an enhanced production experience.

In various implementations, one or more acts of the method 1400 may be performed by one or more components of the system 100 depicted in FIGS. 1-3. For example, various act performed in the method 1400 may be performed internally within one or more components of the intelligent sportscast production engine 102 and/or in some implementations may be performed by one or more online services 146 separate from the intelligent sportscast production engine 102 which itself may be implemented at least in part as an online service.

Examples and/or implementations may be practiced in other specific forms. The described examples and/or implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, for producing a sportscast media stream of a live sporting event, a production route model with target sportscast velocity vectors corresponding to a plurality of waypoints that indicate a change in content direction and/or content magnitude for a sportscast segment of the live sporting event;
   generating production cues for producing sportscast content comprising dynamically ordered audio segments and/or video segments that are synthesized based on live event observations and/or precommitted content, wherein the production cues are selected from cached groups of candidate cues selected as the production cues based on which of the candidate cues most closely align with one or more direction elements and one or more magnitude elements of the target sportscast velocity vectors for a current waypoint of the plurality of waypoints;
   composing the sportscast media stream that comprises the dynamically ordered audio segments and/or video segments that are produced from the production cues integrated with a live video feed and/or a live audio feed captured at the live sporting event; and
   streaming the sportscast media stream to one or more streaming media receivers,
   wherein the target sportscast velocity vectors corresponding to the plurality of waypoints individually comprise:
     the one or more direction elements that indicate to what extent sportscast content corresponding to current game state parameters within the production route model is configured to be selected, the one or more direction elements selected from inform content, insight content, entertain content, and combinations thereof; and
     the one or more magnitude elements that indicate a relative selection priority for content corresponding respectively to the one or more direction elements.

2. The method of claim 1, wherein determining the production route model comprises determining initial sportscast velocity vectors for composing an ordered media stream of synthesized audio segments and/or synthesized video segments for the live sporting event occurring at a sports venue based at least in part on an event type for the live sporting event, a current game state, and a type of the sportscast media stream to be output.

3. The method of claim 1, wherein at least a first portion of the live event observations is derived from:
   a live scoreboard data feed associated with an onsite scoreboard; and/or
   machine recognition of scoreboard data from the live video feed captured by an onsite camera.

4. The method of claim 1, wherein at least a second portion of the live event observations is derived from a combination of:
   a live scoreboard data feed associated with an onsite scoreboard; and
   machine recognition of non-scoreboard data from the live video feed captured by an onsite camera and/or microphone.

5. The method of claim 1, further comprising:
   organizing one or more live event observations based on time of occurrence;
   producing validated live event observations by performing one or more of:
     checking that the occurrence of the one or more live event observations is consistent with the occurrence of one or more prior validated live event observations,
     verifying that the occurrence of the one or more live event observations is consistent with results of machine recognition of non-scoreboard data from the live video feed captured by an onsite camera and/or microphone,
     checking the live event observations for compliance with a set of predetermined rules for a selected type of the live sporting event, and
     combinations thereof, and
   including the validated live event observations in the cached groups of the candidate cues indicating one or more direction elements and/or magnitude elements of the target sportscast velocity vectors from which the sportscast content is selected.

6. The method of claim 1, further comprising performing one or more of weeding out, reordering, and postponing, of live event observations as production cue candidates which are unaligned with current production objectives as indicated by the one or more direction elements of the target sportscast velocity vectors for a current waypoint.

7. The method of claim 1, further comprising modifying timing related parameters of selected live event observations for generating the production cues by performing on the selected live event observations, one or more editing operations selected from splitting, combining, truncating, deleting, lengthening, shortening, reordering, postponing, resuming, and/or combinations thereof.

8. The method of claim 7, wherein reordering the selected live event observations comprises ordering the production cues in an order that is different from a temporally linear order indicated by timestamps of corresponding live event observations.

9. The method of claim 1, further comprising:
   determining a score for the candidate cues within the cached groups for the one or more direction elements of the target sportscast velocity vectors.

10. The method of claim 9, further comprising searching the cached groups of the candidate cues to select content for a best fit proximate production cue based on alignment of the content with current waypoint sportscast velocity vectors.

11. The method of claim 1, further comprising sending synthesized commentary text within production cues designated for vocalization to be vocalized for inclusion in at least a portion of the dynamically ordered audio segments.

12. The method of claim 1, wherein the production cues further comprise instructions for accessing pre-generated audio segments and/or video segments.

13. The method of claim 1, further comprising, modifying and/or generating the precommitted content during the live sporting event, the precommitted content selected from commercial content and/or community interest content based at least in part on information derived from one or more live event observations.

14. The method of claim 13, wherein the precommitted content is retrieved from an ad management system based on the production cues selected to take precedence over sportscast velocity vectors for a current waypoint.

15. The method of claim 1, further comprising composing the sportscast media stream by integrating the dynamically ordered audio segments and/or video segments that are produced from the production cues with the live video feed and/or the live audio feed at synchronization points determined based on target sportscast velocity vectors for a current waypoint.

16. The method of claim 1, further comprising streaming the sportscast media stream to one or more streaming receivers during the live sporting event.

17. The method of claim 16, further comprising streaming, during the live sporting event, an audio-only version of the sportscast media stream.

18. The method of claim 17, further comprising streaming, during the live sporting event, at least a portion of the sportscast media stream to one or more audio devices and/or video devices at the live sporting event.

19. A program product comprising a non-transitory computer readable storage medium storing code, the code being configured to be executable by a processor to perform operations comprising:
- determining a production route model with target sportscast velocity vectors corresponding to a plurality of waypoint sportscast velocity vectors for composing an ordered stream of sportscast audio segments and/or sportscast video segments for a live sporting event occurring at a sports venue based at least on event type, game state, hosting team, and sportscast output type;
- caching groups of live event observations for generating production cues during the live sporting event to be composed as sportscast audio content segments and/or sportscast video content segments, the groups of the live event observations derived from scoreboard data obtained from:
  - a live scoreboard data feed associated with an onsite scoreboard, and/or
  - machine recognition of game state data from a live video feed captured by an onsite camera;
- determining the production cues to be generated from selected live event observations that are selected from the groups of the live event observations based on comparing current waypoint sportscast velocity vectors with current candidate cues;
- generating synthesized video content segments based on one or more of the production cues; and
- generating synthesized audio content segments from commentary text within selected production cues designated for vocalization,
wherein the target sportscast velocity vectors corresponding to the plurality of waypoint sportscast velocity vectors individually comprise:
  - one or more direction elements that indicate to what extent sportscast content corresponding to current game state parameters within the production route model is configured to be selected, the one or more direction elements selected from inform content, insight content, entertain content, and combinations thereof; and
  - one or more magnitude elements that indicate a relative selection priority for content corresponding respectively to the one or more direction elements.

20. A system comprising:
an intelligent sportscast production engine for dynamically producing a streaming sportscast of a live sporting event occurring onsite at a sports venue, the intelligent sportscast production engine comprising:
  - one or more observation connectors configured to output a plurality of live event observations derived from one or more live data feeds captured onsite at the sports venue, the one or more live data feeds comprising:
    - a live scoreboard data feed associated with an onsite scoreboard, and/or
    - machine recognition of game state data from a live video feed captured by an onsite camera;
  - an observation preprocessor configured to produce validated live event observations by performing preprocessing operations on the plurality of live event observations, the preprocessing operations comprising: categorizing live event observations by observation type; ordering event observations based at least in part on observation time stamps; filtering event observations, and combinations thereof;
  - a production route planner with target sportscast velocity vectors corresponding to a plurality of waypoint sportscast velocity vectors configured to select and determine an order of production cues comprising synthesized audiovisual content segments based on current waypoint sportscast velocity vectors of the plurality of waypoint sportscast velocity vectors and live action to sportscast latency, wherein the production route planner is further configured to cause vocalization of synthesized commentary text within selected production cues designated for vocalization; and
  - a media composer configured to output a sportscast media stream by integrating the live video feed and/or a live audio feed with the synthesized audiovisual content segments in the order determined by the production route planner,
wherein at least a portion of the observation connectors, the observation preprocessor, the production route planner, and the media composer comprises one or more of a set of hardware circuits, a set of programmable hardware devices, and executable code stored on a set of non-transitory computer-readable storage media, and
wherein the target sportscast velocity vectors corresponding to the plurality of waypoint sportscast velocity vectors individually comprise:
  - one or more direction elements that indicate to what extent sportscast content corresponding to current game state parameters within the production route planner is configured to be selected, the one or more direction elements selected from inform content, insight content, entertain content, and combinations thereof; and
  - one or more magnitude elements that indicate a relative selection priority for content corresponding respectively to the one or more direction elements.

* * * * *